United States Patent
Melen

(10) Patent No.: US 9,574,964 B2
(45) Date of Patent: Feb. 21, 2017

(54) MOBILE COMPUTER ATMOSPHERIC BAROMETRIC PRESSURE SYSTEM

(71) Applicant: TOYOTA JIDOSHA KABUSHIKI KAISHA, Toyota-shi, Aichi-ken (JP)

(72) Inventor: Roger Melen, Los Altos Hills, CA (US)

(*) Notice: Subject to any disclaimer, the term of this patent is extended or adjusted under 35 U.S.C. 154(b) by 0 days.

(21) Appl. No.: 14/793,713

(22) Filed: Jul. 7, 2015

(65) Prior Publication Data

US 2017/0010174 A1    Jan. 12, 2017

(51) Int. Cl.
| | |
|---|---|
| *G01L 27/00* | (2006.01) |
| *G08G 1/16* | (2006.01) |
| *G01C 21/26* | (2006.01) |
| *G01S 19/42* | (2010.01) |
| *B62D 15/02* | (2006.01) |
| *G06K 9/00* | (2006.01) |
| *H04L 29/08* | (2006.01) |
| *H04W 4/00* | (2009.01) |

(52) U.S. Cl.
CPC .......... *G01L 27/005* (2013.01); *B62D 15/025* (2013.01); *G01C 21/26* (2013.01); *G01S 19/42* (2013.01); *G06K 9/00798* (2013.01); *G08G 1/161* (2013.01); *H04L 67/12* (2013.01); *H04W 4/005* (2013.01)

(58) Field of Classification Search
CPC ..... G01L 27/005; B62D 15/025; G01C 21/26; G01C 5/06; G01S 19/42; G06K 9/00798; G08G 1/161; H04L 67/12; H04W 4/005
USPC ....................... 701/41; 702/166, 47; 324/460
See application file for complete search history.

(56) References Cited

U.S. PATENT DOCUMENTS

| | | | | |
|---|---|---|---|---|
| 8,676,472 | B2* | 3/2014 | Tsukamoto | F02D 41/18 701/103 |
| 2003/0023399 | A1* | 1/2003 | Yun | G01O 5/06 702/138 |
| 2004/0239529 | A1 | 12/2004 | Tran | |
| 2006/0100782 | A1* | 5/2006 | Levi | G01C 21/28 701/468 |
| 2007/0273553 | A1* | 11/2007 | Albrecht | B60R 25/20 340/932.2 |

(Continued)

FOREIGN PATENT DOCUMENTS

| | | |
|---|---|---|
| EP | 2072949 A2 | 4/2009 |
| WO | 2009101566 A1 | 8/2009 |
| WO | 2013136251 A1 | 9/2013 |

*Primary Examiner* — Marthe Marc-Coleman
(74) *Attorney, Agent, or Firm* — Burbage Law, PC; Jon-Michael Burbage; Elizabeth Ruzich

(57) ABSTRACT

The disclosure includes a system, method and tangible memory for providing a vehicular barometric pressure reading. The system includes a plurality of electronic sensor devices configured to record first barometric pressure data describing a first barometric pressure associated with the vehicle. Each of the electronic sensor devices may record a separate barometric pressure reading associated with the vehicle. The system may further include an onboard vehicle computer that is communicatively coupled to the plurality of electronic sensor devices and programmed to (1) analyze the separate barometric pressure readings to determine, for each of the electronic sensor devices, a confidence factor indicating a confidence in the accuracy of the barometric pressure reading for each of the electronic sensor devices and (2) determine whether to provide a sensor service recommendation based on the confidence factor.

7 Claims, 17 Drawing Sheets

(56) References Cited

U.S. PATENT DOCUMENTS

| | | | |
|---|---|---|---|
| 2009/0198439 A1* | 8/2009 | Ochiai | B60K 6/365 701/112 |
| 2009/0217754 A1* | 9/2009 | Binda | G01O 5/06 73/384 |
| 2010/0026503 A1* | 2/2010 | Proefke | G01O 5/06 340/601 |
| 2010/0273553 A1* | 10/2010 | Zalewski | A63F 13/12 463/31 |
| 2012/0089314 A1* | 4/2012 | Nistler | F02D 28/00 701/102 |
| 2014/0286025 A1* | 9/2014 | Kamitani | B60Q 1/115 362/466 |
| 2016/0047649 A1* | 2/2016 | Edge | H04W 4/025 455/73 |
| 2016/0231192 A1* | 8/2016 | Hammerschmidt | G01L 9/0072 |
| 2016/0280160 A1* | 9/2016 | MacNeille | B60R 16/037 |
| 2016/0297671 A1* | 10/2016 | Pahl | B81B 7/0048 |

* cited by examiner

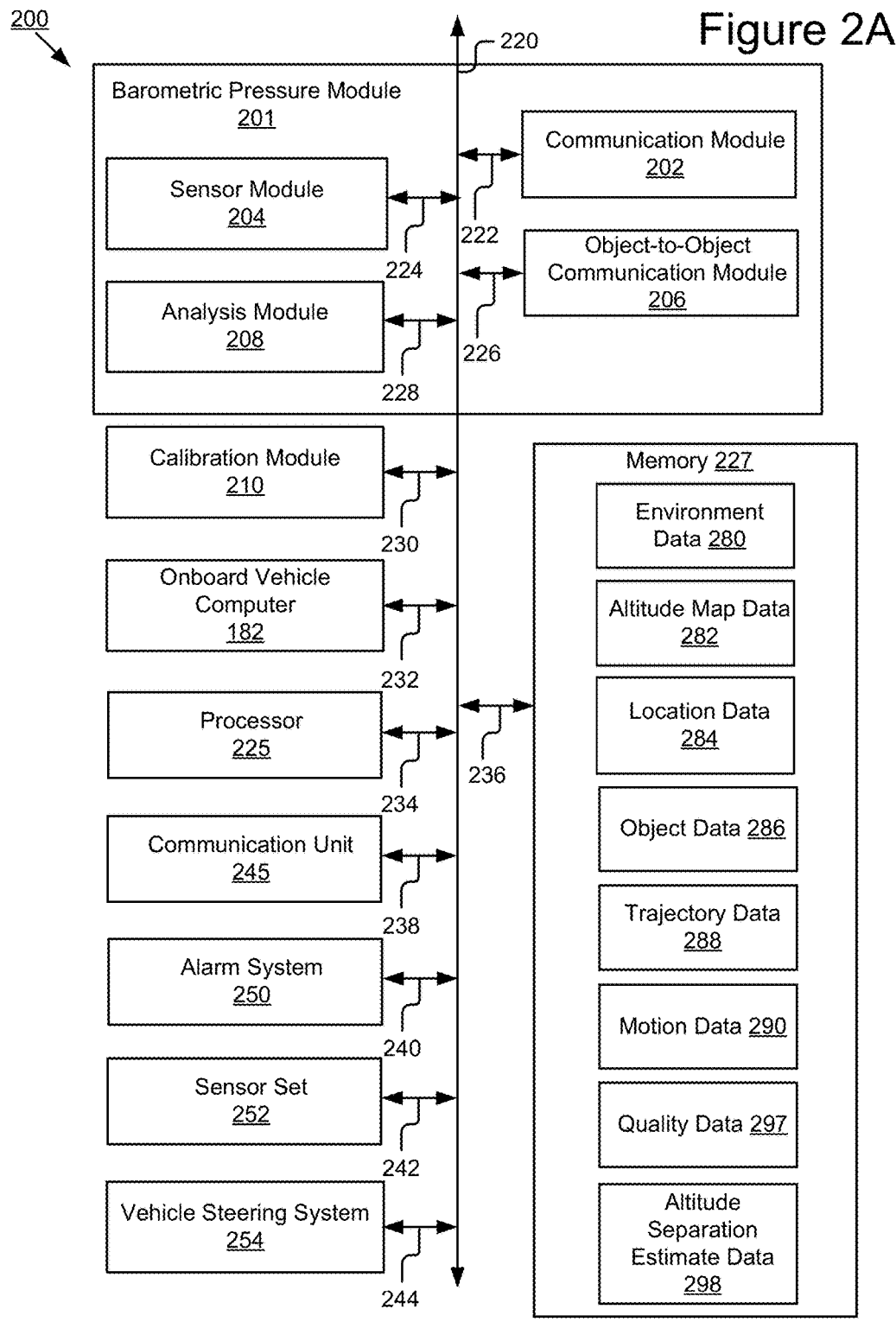

|  | Barometric Pressure Sensor #1 | | Barometric Pressure Sensor #2 | |
| --- | --- | --- | --- | --- |
| | Pressure Value % of STP | Equivalent Altitude feet (0.0355hPa/ft at sea level) | Pressure Value % of STP | Equivalent Altitude feet (0.0355hPa/ft at sea level) |
| Resolution | 0.01 hPa 0.001% | 0.27 feet 3.3 inches | .012 hPa 1013 29.92 0.0012% | 0.33 feet 4" |
| Relative Pressure Accuracy | 0.2hPa 0.02% | 5.47 feet | | |
| Absolute Accuracy (linearity) | 2.50 hPa 0.25% | 68.4 feet | 1.5 hPa 0.15% | 41.7 feet |
| Long Term Yearly Stability | 1.0 hPa/year 0.10% | 27.4 feet | 1.0 hPa/year 0.10% | 27.4 feet |
| Max Resolution Update time | 26ms | | 8ms | |
| | Software Corrections. Offset (19bit), Temperature (16 bit), Other | | | |

Figure 10a. Effect of Temperature and Elevation On Pressure Base Air Column Altitude Estimates

| Elevation | Air Temperature 60F | Change in pressure per foot | | Air Temperature 100F | Change in pressure per foot | | Air Temperature 20F | Change in pressure per foot | |
|---|---|---|---|---|---|---|---|---|---|
| | Millibars | Feet per millibar | | Millibars | Feet per millibar | Temp Sensitivity Feet per degree f | Millibars | Feet per millibar | Temp Sensitivity Feet per degree F |
| 0 | 1013.3 | | | 1013.3 | | | 1013.3 | | |
| 10 | 1012.9 | 27.4 | | 1012.9 | 29.5 | 0.02 | 1012.9 | 25.3 | 0.0 |
| 1000 | 977.2 | | | 979.8 | | | 974.3 | | |
| 1010 | 976.9 | 28.2 | | 979.4 | 30.3 | 1.87 | 973.9 | 26.1 | -2.0 |
| 2000 | 942.3 | | | 947.2 | | | 936.5 | | |
| 2010 | 941.9 | 28.4 | | 946.9 | 31.1 | 3.69 | 936.2 | 26.9 | -4.0 |
| 4000 | 875.4 | | | 884.7 | | | 864.6 | | |
| 4010 | 875.0 | 30.8 | | 884.4 | 32.9 | 7.44 | 864.2 | 28.7 | -8.0 |
| 7000 | 782.3 | | | 797.2 | | | 765.1 | | |
| 7010 | 782.0 | 33.7 | | 796.9 | 35.8 | 13.00 | 764.8 | 31.7 | -14.0 |

Figure 10A

Figure 10b. Typical % Change In Density Between Dry Air and 100% Humid Air

| Air Temp Degrees F | % Change in Air Density |
|---|---|
| 40 | 0.3 |
| 50 | 0.5 |
| 60 | 0.6 |
| 70 | 1.0 |
| 80 | 1.3 |

Humid air is less roughly 1% less dense than Dry Air At 70 F

Figure 10B

| Parameter | Min | Nominal | Max | Units |
|---|---|---|---|---|
| Humidity range | 1 | | 99 | % |
| Accuracy | -3 | | +3 | % |
| Temperature range | -10 | | +60 | °C |
| Stability versus time | | 1 | | % |

1200

| Operating Temperature -10-+85 °C | Min | Max | Units |
|---|---|---|---|
| Accuracy | -0.8 | 0.8 | °C |
| Resolution | -.01 | .01 | °C |

1300

MOBILE COMPUTER ATMOSPHERIC BAROMETRIC PRESSURE SYSTEM

BACKGROUND

The specification relates to a mobile computer atmospheric barometric pressure system.

Barometric pressure is the pressure exerted by the weight of air in the atmosphere of Earth. In some circumstances barometric pressure is closely approximated by the hydrostatic pressure caused by the weight of air above some predetermined measurement point. On a given plane, low-pressure areas have less atmospheric mass above their location, whereas high-pressure areas have more atmospheric mass above their location. Likewise, as elevation increases, there is less overlying atmospheric mass. Atmospheric pressure is related to the overlying mass. Atmospheric pressure generally decreases with increasing elevation. On average, a column of air one square centimeter in cross-section, measured from sea level to the top of the atmosphere, has a mass of about 1.03 kilogram (kg) and weight of about 10.1 Newtons (N). A column one square inch in cross-section would have a weight of about 14.7 pounds (lbs) or about 65.4 N. Barometric pressure is sometimes called atmospheric pressure. For the purpose of clarity, the term "barometric pressure" is used in this disclosure.

SUMMARY

The subject matter described in this disclosure includes a mobile computer atmospheric barometric pressure system (herein "the system" or "the barometric pressure system") described according to some implementations. In some implementations, the barometric pressure system may be an element of a vehicle or a mobile device.

The vehicle may include a special-purpose computing device. For example, the vehicle may include an onboard vehicle computer that includes hardware and software specially designed and manufactured to meet the needs of the onboard vehicle computer so that the vehicle provides a safe and desirable user experience that conforms to federal and local regulations (e.g., safety, air emissions, Federal Communication Commission regulation of wireless transmissions, etc.).

The mobile device may include a processor-based computing device. For example, the mobile device may include a smartphone, tablet computer, laptop, smartwatch, Internet-of-Things device, personal computer, stationary roadside device, etc. The mobile device may include a processor. The processor may be programmed to provide some or all of the functionality described herein with reference to the system. In this way, the mobile device may be a special-purpose computing device programmed to provide the functionality described herein with reference to the system.

The vehicle or the mobile device may include an alarm system. The alarm system may include a processor based computing device or be an element of a processor based computing device. For example, the alarm system may be an element of the onboard vehicle computer. The alarm system may also be an element of a smartphone or some other mobile device.

In some implementations, the alarm system may be configured to analyze sensor data and determine whether the vehicle or the mobile device is on a trajectory that will result in a collision with an object on the roadway. The sensor data may include data describing measurements detected and recorded by one or more electronic sensor devices of the vehicle or the mobile device. The object may be another vehicle or any other object on the roadway.

The alarm system may be configured to provide a collision threat alarm to a driver of the vehicle or a user of the mobile device. The alarm system may provide the collision threat alarm if the vehicle or the mobile device is determined to be on a trajectory that will result in a collision. The collision threat alarm may include providing an audible signal to the driver (or the user), a visual signal to the driver (or the user) or a combination of an audible and visual signal to the driver (or the user). Proving the collision threat alarm to the driver (or the user) may be referred to as a collision threat alarm incident.

The alarm system may be configured to provide automated mitigation actions by onboard systems or recommendations to an autonomous driving controller in response to an alarm condition. The barometric pressure system may be configured to improve the performance or operation of the alarm system. For example, assume that the barometric pressure system is an element of a vehicle. The sensor data may include data describing the location, speed and trajectory of the vehicle at a specified time. The sensor data may also include data describing the location, speed and trajectory of the object on the roadway. The sensor data may include location data indicating the latitude and longitude coordinates for the vehicle and the object as indicated by one or more global positioning systems. The sensor data may also include elevation data describing the elevations of the vehicle and the object as indicated by the one or more global positioning systems. The alarm system may analyze the sensor data and determine that a collision will occur between the vehicle and the object. However, the latitude and longitude data do not indicate the relative altitude of the vehicle and the object. The global positioning system may provide sensor data describing inaccurate elevation positioning data. Even if the sensor data received from the global positioning system were accurate, wireless communication with the global positioning system may suffer reception disruptions. If the vehicle is driving on a surface road and the object is driving on an overpass directly above the vehicle and the surface road, the latitude and longitude data may indicate that the vehicle and the object are on a collision course with one another. In these situations the alarm system may provide a collision threat alarm if accurate elevation data is not available from GPS. However, in this example the collision threat alarm is erroneous because the vehicle and the object are located at different altitudes, and so, the vehicle and the object will not collide with one another.

The barometric pressure system described herein improves the performance of the alarm system by ensuring that such erroneous alarms do not occur. For example, the barometric pressure system may include a barometric pressure sensor to measure and record the barometric pressure for the vehicle. The barometric pressure difference between systems relates to the altitude differences of the systems. Forces such as acceleration of the system may cause the reading of the barometric pressure to be inaccurate. The barometric pressure system may include one or more electronic sensor devices to record the acceleration or roadway noise. The barometric pressure system may include processors that are programmed to adjust the measured barometric pressure to account for these forces and achieve an accurate measurement of the barometric pressure. The adjusted measurement of the barometric pressure may be referred to herein as an "acceleration-adjusted reading of the barometric pressure," an "acceleration-adjusted reading of the first barometric pressure," an "acceleration-adjusted reading of the second barometric pressure" or some similar terminology.

Other forces which may be measured and adjusted for include roadway noise. The roadway noise may include the noise and vibration caused by nearby vehicles that are passing the vehicle. For example, the roadway noise may include the noise and vibration caused in a smaller vehicle when a heavy truck passes the smaller vehicle.

Other benefits of the barometric pressure system are described herein and will be apparent based on the description.

Described according to some implementations is a barometric pressure system that includes a wireless communication network (communication network) which communicatively couples a first vehicle and a second vehicle. The second vehicle may be traveling in the same direction as the first vehicle. The second vehicle may be located in a different lane relative to the first vehicle while still traveling in the same direction as the first vehicle. For example, the first vehicle may be located in the first lane or a northbound roadway. The second vehicle may be located in the second lane of the northbound roadway.

The second vehicle includes an alarm system. The alarm system may be configured to analyze sensor data of the second vehicle and determine whether the second vehicle is on a trajectory that will result in the second vehicle colliding with an object on the roadway. The object may be another vehicle or any other object on the roadway. The alarm system is configured to provide a collision threat alarm to a driver of the second vehicle if the second vehicle is determined to be on a trajectory that will result in the second vehicle colliding with an object on the roadway. The collision threat alarm may include providing an audible signal to the driver, a visual signal to the driver or a combination of an audible and visual signal to the driver. Proving the collision threat alarm to the driver may be referred to as a collision threat alarm incident.

The first vehicle includes a set of first electronic sensor devices, a second electronic sensor device and a first onboard vehicle computer. The set of first electronic sensor devices are configured to record first barometric pressure data describing a first barometric pressure associated with the first vehicle. The second electronic sensor device is configured to record acceleration data describing an acceleration of the first vehicle.

The first onboard vehicle computer is communicatively coupled to the DSRC communication network, the set of first electronic sensor devices and the second electronic sensor device. The first onboard vehicle computer is programmed to (1) adjust the first barometric pressure data based on the acceleration of the first vehicle so that the first barometric pressure data describes an acceleration-adjusted reading of the first barometric pressure associated with the first vehicle and (2) automatically transmit the first barometric pressure data describing the acceleration-adjusted reading to a selected channel of the DSRC communication network.

The second vehicle includes a second onboard vehicle computer. The second onboard vehicle computer is communicatively coupled to the selected channel of the DSRC communication network. The second onboard vehicle computer is programmed to receive the first barometric pressure data describing the acceleration-adjusted reading. The second onboard vehicle computer is programmed to determine an estimate of altitude separation based on the first barometric pressure data and second barometric pressure data describing a second barometric pressure associated with the second mobile device.

The estimate of altitude separation describes an estimate of whether the first vehicle and the second vehicle are located at substantially the same altitude. The second onboard vehicle computer is programmed to suppress a collision threat alarm based on the estimate of altitude separation indicating that the first vehicle and the second vehicle are not located at substantially the same altitude.

The altitude separation may be based on the differential barometric pressure between the first mobile device and the second mobile device. In other words, the altitude separation may be determined by subtracting the lower of the two barometric pressures from the higher of the two barometric pressures to determine the differential barometric pressure between the first mobile device and the second mobile device. The differential barometric pressure and the estimate of the altitude separation may be directly proportional in that the closer the differential barometric pressure is to zero, the closer the estimate of altitude separation is to zero. An estimated altitude separation equal to zero indicates that the two objects are located at substantially the same altitude. If the first vehicle and the second vehicle are located at substantially the same altitude and also on a collision course, then the collision threat alarm is not suppressed.

Also described according to some implementations is a barometric pressure system of a mobile device. The barometric pressure system includes: a wireless network communicatively coupled to the mobile device; a first electronic sensor device configured to record barometric pressure data describing a barometric pressure associated with the mobile device; a second electronic sensor device configured to record acceleration data describing an acceleration of the mobile device; and a processor communicatively coupled to the wireless network, the first electronic sensor device and the second electronic sensor device.

The processor is programmed to adjust the barometric pressure data based on the acceleration of the mobile device so that the barometric pressure data describes an acceleration-adjusted reading of the barometric pressure associated with the mobile device. The processor is also programmed to automatically transmit the barometric pressure data describing the acceleration-adjusted reading to the wireless network. The processor is programmed to transmit the barometric pressure data to the wireless network in substantially real time. For example, the processor may be programmed to transmit the barometric pressure data to the wireless network in every 0.1 seconds. In some implementations, the processor may be programmed to transmit the barometric pressure data to the wireless network in a time interval configured by the processor to avoid a collision threat alarm incident.

Also described according to some implementations is a barometric pressure system of a mobile device including a wireless network communicatively coupled to the mobile device. The barometric pressure system may include a set of first electronic sensor devices configured to record barometric pressure data describing a barometric pressure associated with the mobile device. The barometric pressure system may include a second electronic sensor device configured to record acceleration data describing an acceleration of the mobile device. The barometric pressure system may also include a processor communicatively coupled to the wireless network, the set of first electronic sensor devices and the second electronic sensor device.

The processor is programmed to (1) determine quality data describing a quality of the barometric pressure data and (2) adjust the barometric pressure data based on the quality of the barometric pressure data and the acceleration of the mobile device so that the barometric pressure data describes a quality and acceleration-adjusted reading of the barometric pressure associated with the mobile device. The processor is also programmed to automatically transmit the barometric pressure data describing the acceleration-adjusted reading to the wireless network.

The quality and acceleration-adjusted reading of the barometric pressure may indicate a measurement of the barometric pressure that is adjusted to account for (1) barometric pressure sensors that may require calibration as indicated by the quality data and (2) the effect of acceleration forces on the ability of a barometric pressure sensor to measure barometric pressure.

In some implementations, the quality data may be based on one or more of (1) time to live data associated with the set of first electronic sensor devices and describing an estimate of how long the set of first electronic sensor devices are estimated to live and (2) time since calibration data associated with the set of first electronic sensor devices and describing how long since the set of first electronic sensor devices was calibrated.

In some implementations, the barometric pressure sensor may include a MicroElectroMechanical (MEMS) sensor. The barometric pressure data may be determined based on MEMS sensor deflection and the temperature of the MEMS sensor. Deflection nonlinearity may indicate inaccuracy in the readings of the MEMS sensor. The nonlinearity may be corrected using calibration data determined based on a calibrated pressure source and a temperature reading taken from the onboard temperature sensor of the vehicle. The MEMS sensor may include a non-transitory, non-volatile memory. The calibration data may be stored in the memory of the MEMS sensor.

Also described according to some implementations is a barometric pressure system including a wireless network communicatively coupled to a first mobile device and a second mobile device. The first mobile device includes a set of first electronic sensor devices, a second electronic sensor device and a first processor. The set of first electronic sensor devices are configured to record first barometric pressure data describing a first barometric pressure associated with the first mobile device. The second electronic sensor device is configured to record acceleration data describing an acceleration of the first mobile device.

The first processor is communicatively coupled to the wireless network, the set of first electronic sensor devices and the second electronic sensor device. The first processor is programmed to (1) adjust the first barometric pressure data based on the acceleration of the first mobile device so that the first barometric pressure data describes an acceleration-adjusted reading of the first barometric pressure associated with the first mobile device and (2) automatically transmit the first barometric pressure data describing the acceleration-adjusted reading to the wireless network.

The second mobile device is communicatively coupled to the wireless network and configured to receive the first barometric pressure data describing the acceleration-adjusted reading. The second mobile device is configured to determine an estimate of altitude separation based on the first barometric pressure data and second barometric pressure data describing a second barometric pressure associated with the second mobile device. The estimate of altitude separation describes an estimate of whether the first mobile device and the second mobile device are located at substantially the same altitude.

In some implementations, the estimate of altitude separation describes a delta in altitude for the first mobile device and the second mobile device. In some implementations, at least one of the first mobile device and the second mobile device is a vehicle.

In some implementations, the first mobile device includes a subsystem configured to determine a first geographic location vector based on (1) a first location of the first mobile device at a first time, (2) a first speed of the first mobile device, (3) and a first direction of the first mobile device and (4) the first barometric pressure data describing the acceleration-adjusted reading. The first geographic location vector may include vector data describing the location of the first mobile device (e.g., the first location) at a first time (e.g., a specified time), the speed of the first mobile device, the direction of travel of the first mobile device and the acceleration-adjusted reading of the barometric pressure associated with the first mobile device while present at the location or substantially at the first location. The first mobile device transmits the first geographical location vector to the wireless network.

The second mobile device receives the first geographical location vector from the wireless network. The second mobile device includes a second processor that is programmed to determine a second geographic location vector based on (1) a second location of the second mobile device at a second time, (2) a second speed of the second mobile device; (3) a second direction of the second mobile device and (4) the second barometric pressure data associated with the second mobile device. The second geographic location vector may include vector data describing the location of the second mobile device (e.g., the second location) at a second time (e.g., a specified time), the speed of the second mobile device, the direction of travel of the second mobile device and the acceleration-adjusted reading of the barometric pressure associated with the second mobile device while present at the location or substantially at the second location.

The second processor is further programmed to determine an estimate of whether the first mobile device and the second mobile device will collide based on the first geographical location vector, the second geographical location vector and the estimate of altitude separation.

In some implementations, the first geographical location vector and the second geographical location vector indicate that the first mobile device and the second mobile device will collide but the second processor determines that the first mobile device and the second mobile device will not collide based on a determination that the estimate of altitude separation indicates that the first mobile device and the second mobile device are not located at substantially the same altitude.

In some implementations, the second processor of the second mobile device suppresses a collision threat alarm based on a determination that the first mobile device and the second mobile device will not collide because they are not located at substantially the same altitude.

Also described according to some implementations is a barometric pressure system of a vehicle including a plurality of electronic sensor devices configured to record first barometric pressure data describing a first barometric pressure associated with the vehicle. Each of the electronic sensor devices records a separate barometric pressure reading associated with the vehicle.

The barometric pressure system of the vehicle also includes an onboard vehicle computer that is communicatively coupled to the plurality of electronic sensor devices and programmed to (1) analyze the separate barometric pressure readings associated with the plurality of electronic sensor devices to determine, for each of the electronic sensor devices, a confidence factor indicating confidence in the accuracy of the barometric pressure reading for each of the electronic sensor devices and (2) determine whether to provide a sensor service recommendation based on the confidence factor.

In some implementations, the onboard vehicle computer is programmed to analyze variation of the separate barometric pressure readings among the plurality of electronic sensor devices to determine the confidence factor.

In some implementations, the confidence factor is based in part on one or more of (1) time to live data associated with the plurality of electronic sensor devices and describing an estimate of how long the plurality of electronic sensor devices are estimated to live and (2) time since calibration data associated with the plurality of electronic sensor devices and describing how long since the plurality of electronic sensor devices was calibrated.

In some implementations, the barometric pressure system also includes a wireless network and a mobile device. The vehicle and the mobile device are communicatively coupled to the wireless network and the vehicle receives second barometric pressure data describing a second barometric pressure reading associated with the mobile device. The onboard vehicle computer is programmed to (1) analyze the second barometric pressure reading associated with the mobile device and the separate barometric pressure readings associated with the plurality of electronic sensor devices to determine, for each of the electronic sensor devices, the confidence factor indicating confidence in the accuracy of the barometric pressure reading for each of the electronic sensor devices and (2) determine whether to provide the sensor service recommendation based on the confidence factor.

The second mobile device is communicatively coupled to the wireless network and configured to receive the first barometric pressure data describing the acceleration-adjusted reading and determine an estimate of altitude separation based on the first barometric pressure data and second barometric pressure data describing a second barometric pressure associated with the second mobile device. The estimate of altitude separation describes an estimate of whether the first mobile device and the second mobile device are located at substantially the same altitude.

Also described according to some implementations is a barometric pressure system of a mobile device configured to determine the location of the mobile device based on an acceleration-adjusted barometric pressure. The barometric pressure system includes a non-transitory storage medium storing altitude map data. The altitude map data describes an altitude map for a geographic area and a plurality of altitudes associated with a plurality of locations included in the geographic area. The barometric pressure system also includes a global positioning system configured to determine location data describing an estimate of a location of the mobile device. The barometric pressure system also includes a set of first electronic sensor devices configured to record barometric pressure data describing a barometric pressure associated with the mobile device. The barometric pressure system also includes a second electronic sensor device configured to record acceleration data describing an acceleration of the mobile device.

The barometric pressure system also includes a processor communicatively coupled to the non-transitory storage medium, the global positioning system, the set of first electronic sensor devices and the second electronic sensor device. The processor is programmed to (1) adjust the barometric pressure data based on the acceleration of the mobile device so that the barometric pressure data describes an acceleration-adjusted reading of the barometric pressure associated with the mobile device, (2) determine an altitude-based geographic location of the mobile device by analyzing the altitude map to identify a location having an altitude indicated by the barometric pressure data and (3) adjust the location data based on the altitude-based geographic location so that the location data more accurately describes the location of the mobile device.

Also described according to some implementations is a barometric pressure system of a vehicle configured to automatically generate an altitude map for a lane of a roadway in a geographic area based on an acceleration-adjusted barometric pressure. The barometric pressure system includes a global positioning system configured to determine location data describing an estimate of a location of the vehicle. The barometric pressure system also includes a roadway imaging device configured to determine which lane the vehicle is located in while at the location. The barometric pressure system also includes a set of first electronic sensor devices configured to record barometric pressure data describing a barometric pressure associated with the vehicle. The barometric pressure system also includes a second electronic sensor device configured to record acceleration data describing an acceleration of the vehicle.

The barometric pressure system also includes an onboard vehicle computer communicatively coupled to a non-transitory storage medium, the global positioning system, the roadway imaging device, the set of first electronic sensor devices and the second electronic sensor device. The onboard vehicle computer is programmed to (1) adjust the barometric pressure data based on the acceleration of the vehicle so that the barometric pressure data describes an acceleration-adjusted reading of the barometric pressure associated with the vehicle, (2) adjust the location data to include the lane the vehicle was located in while at the location, (3) determine an altitude for the lane based on the first barometric pressure data and (4) store altitude map data in the non-transitory memory describing the location data and the altitude for the lane the vehicle was located in while at the location.

In some implementations, the onboard vehicle computer is further programmed to generate a geographic location vector for the vehicle based on one or more of: (1) the location data; (2) a first speed of the vehicle; (3) the barometric pressure data describing the acceleration-adjusted reading of the barometric pressure associated with the vehicle; (4) the altitude map data; (5) a current time; (6) a direction of the vehicle and (7) the an acceleration of the vehicle.

Also described according to some implementations is a barometric pressure system of a vehicle configured to automatically steer the vehicle based on an acceleration-adjusted barometric pressure. The barometric pressure system includes a non-transitory storage medium storing altitude map data. The altitude map data describes an altitude map for a geographic area and a plurality of altitudes associated with a plurality of lane locations included in the geographic area. The barometric pressure system also includes a global positioning system configured to determine location data describing an estimate of a location of the vehicle. The barometric pressure system also includes a roadway imaging device configured to determine which lane the vehicle is located in while at the location and detect an instance where a trajectory of the vehicle will cause the vehicle to leave the lane without authorization if not corrected. The barometric pressure system also includes a set of first electronic sensor devices configured to record barometric pressure data describing a barometric pressure reading associated with the vehicle. The barometric pressure system also includes a second electronic sensor device configured to record acceleration data describing an acceleration of the vehicle.

The barometric pressure system also includes an onboard vehicle computer communicatively coupled to the global positioning system, the roadway imaging device, the set of first electronic sensor devices and the second electronic sensor device. The onboard vehicle computer is programmed to (1) adjust the barometric pressure data based on the acceleration of the vehicle so that the barometric pressure data describes an acceleration-adjusted reading of the barometric pressure associated with the vehicle, (2) determine an altitude-based geographic location of the vehicle by analyzing the altitude map to identify a location having an altitude indicated by the barometric pressure data, (3) adjust the location data based on the altitude-based geographic location so that the location data more accurately describes the location of the vehicle and which lane the vehicle is located in while at the location, (4) determine a corrective action including which direction to steer the vehicle so that the trajectory of the vehicle will cause the vehicle to remain in the lane and (5) cause the vehicle to be steered based on the corrective action so that the trajectory of the vehicle will cause the vehicle to remain in the lane.

Also described according to some implementations is a barometric pressure system including a wireless network communicatively coupled to a first mobile device and a second mobile device which is located at substantially the same altitude as the first mobile device. The first mobile device includes a set of first electronic sensor devices, a second electronic sensor device and a first processor. The barometric pressure system also includes a non-transitory memory. The set of first electronic sensor devices are configured to record first barometric pressure data describing a first barometric pressure reading associated with the first mobile device. The second electronic sensor device is configured to record acceleration data describing an acceleration of the first mobile device.

The first processor is communicatively coupled to the wireless network, the non-transitory memory, the set of first electronic sensor devices and the second electronic sensor device. The first processor is programmed to adjust the first barometric pressure data based on the acceleration of the first mobile device so that the first barometric pressure data describes an acceleration-adjusted reading of the first barometric pressure associated with the first mobile device.

The second mobile device is communicatively coupled to the wireless network. The second mobile device is configured to transmit second barometric pressure data describing a second barometric pressure associated with the second mobile device.

The first processor, which is communicatively coupled to the wireless network, is programmed to receive the second barometric pressure data from the wireless network. The first processor is programmed to determine a variance between the first barometric pressure and the second barometric pressure.

The non-transitory memory stores a plurality of historical variances determined based on a plurality of second barometric pressure data received from a plurality of second mobile devices. The first processor is programmed to analyze the variance and the historical variance to determine an adjustment for the acceleration-adjusted reading of the first barometric pressure so that the acceleration-adjusted reading of the first barometric pressure is more accurate.

In some implementations, the first mobile device is a first vehicle and the second mobile device is a second vehicle that is traveling in the same direction as the first vehicle and passing the first vehicle. For example, the first mobile device is heading in a northbound direction in lane one of a freeway. The second mobile device is also heading in the northbound direction in lane two of the same freeway. The second mobile device is traveling at a faster speed than the first mobile device so that the second mobile device is passing the first mobile device.

In some implementations, the first processor is programmed to (1) determine vehicle motion and air flow noise associated with the second vehicle passing the first vehicle, (2) determine an effect of the vehicle motion and air flow noise on the acceleration-adjusted reading of the first barometric pressure associated with the first vehicle and (3) modify the acceleration-adjusted reading of the first barometric pressure so that the effect is filtered from the acceleration-adjusted reading of the first barometric pressure.

In some implementations, the first processor applies signal processor to filter the effect from the acceleration-adjusted reading of the first barometric pressure.

In some implementations, the set of first electronic sensor devices and the second electronic sensor device are mounted in the first mobile device in a configuration designed to reduce the effect of the of the vehicle motion and air flow noise on the acceleration-adjusted reading of the first barometric pressure associated with the first mobile device.

In some implementations, the barometric pressure system includes a third mobile device. The third mobile device is communicatively coupled to the wireless network. The third mobile device is configured to transmit third barometric pressure data describing a third barometric pressure associated with the third mobile device. The third barometric pressure data may be transmitted to the wireless network.

The first processor is programmed to receive the third barometric pressure data from the wireless network and determine a variance among the first barometric pressure, the second barometric pressure and the third barometric pressure. The first processor is programmed to analyze (1) the variance associated with the first barometric pressure, the second barometric pressure and the third barometric pressure and (2) the historical variance to determine an adjustment for the acceleration-adjusted reading of the first barometric pressure so that the acceleration-adjusted reading of the first barometric pressure is more accurate.

In some implementations, the third mobile device is a stationary roadside device. For example, the third mobile device is an element of a traffic signal, a pedestrian crosswalk signal, a roadway camera system configured to monitor and determine traffic flow or detect traffic ordinance violations, a special-purpose device configured to provide the functionality of the third mobile device, or any other processor-based computing device mounted along a roadway.

Also described according to some implementations is a barometric pressure system of a vehicle configured to determine three dimensional location data describing the three dimensional location of the vehicle. The barometric pressure system includes a non-transitory storage medium storing altitude map data. The altitude map data describes an altitude map for a geographic area and a plurality of known barometric pressures associated with a plurality of locations included in the geographic area. The barometric pressure system includes a global positioning system configured to determine location data describing an estimate of a location of the vehicle. The barometric pressure system includes a roadway imaging device configured to determine one or more items of interest surrounding the vehicle. The barometric pressure system includes a set of first electronic sensor devices configured to record barometric pressure data describing a barometric pressure reading associated with the vehicle. The barometric pressure system includes a second electronic sensor device configured to record acceleration data describing an acceleration of the vehicle.

The barometric pressure system includes an onboard vehicle computer communicatively coupled to the global positioning system, the roadway imaging device, the set of first electronic sensor devices and the second electronic sensor device. The onboard vehicle computer is programmed to (1) adjust the barometric pressure data based on the acceleration of the vehicle so that the barometric pressure data describes an acceleration-adjusted reading of the barometric pressure associated with the vehicle and (2) determine the three dimensional location data describing the three dimensional location of a vehicle based on the (a) one or more items of interest surrounding the vehicle matching one or more known items of interest associated with the estimate of the location of the vehicle and (b) the acceleration-adjusted reading of the barometric pressure associated with the vehicle matching a known barometric pressure and a location associated with the matching known barometric pressure included in the altitude map.

Also described according to some implementations is a barometric pressure system of a vehicle including a wireless network communicatively coupled to the vehicle and a mobile device. The vehicle includes a first set of electronic sensor devices, a second electronic sensor device and an onboard vehicle computer. The set of first electronic sensor devices is configured to record first barometric pressure data describing a first barometric pressure reading associated with the vehicle. The second electronic sensor device configured to record acceleration data describing an acceleration of the vehicle. The vehicle and the mobile device are communicatively coupled to the wireless network. The mobile device transmits second barometric pressure data describing a second barometric pressure reading associated with the mobile device.

The onboard vehicle computer is communicatively coupled to the wireless network, the set of first electronic sensor devices and the second electronic sensor device. The onboard vehicle computer is programmed to (1) adjust the first barometric pressure data based on the acceleration of the vehicle so that the first barometric pressure data describes an acceleration-adjusted reading of the first barometric pressure associated with the vehicle, (2) determine a variance between the second barometric pressure reading and the acceleration-adjusted reading of the first barometric pressure associated with the vehicle, (3) determine lateral differential data describing a lateral distance from the vehicle and the mobile device based on the variance and (4) determine an estimate of altitude separation between the vehicle and the mobile device based on the lateral differential data.

In some implementations, the barometric pressure system of the vehicle further comprises one or more third electronic sensor devices configured to measure and record temperature and humidity associated with the vehicle. In these implementations, the onboard vehicle computer is further programmed to adjust the first barometric pressure data based on the acceleration, the temperature and the humidity of the vehicle.

In some implementations, the barometric pressure system is further configured to determine whether to trigger a collision threat alarm based at least in part on the lateral differential data and the estimate of altitude separation between the vehicle and the mobile device.

Other aspects may include corresponding methods, apparatus, and computer program products.

BRIEF DESCRIPTION OF THE DRAWINGS

The disclosure is illustrated by way of example, and not by way of limitation in the figures of the accompanying drawings in which like reference numerals are used to refer to similar elements.

FIG. 2A is a block diagram illustrating an example barometric pressure system.

FIG. 9 is a chart depicting a specification of an example barometric pressure sensor included in the sensor set of the barometric pressure system.

FIGS. 10A and 10B are charts depicting example data that may be stored in a memory.

DETAILED DESCRIPTION

Figure 1:
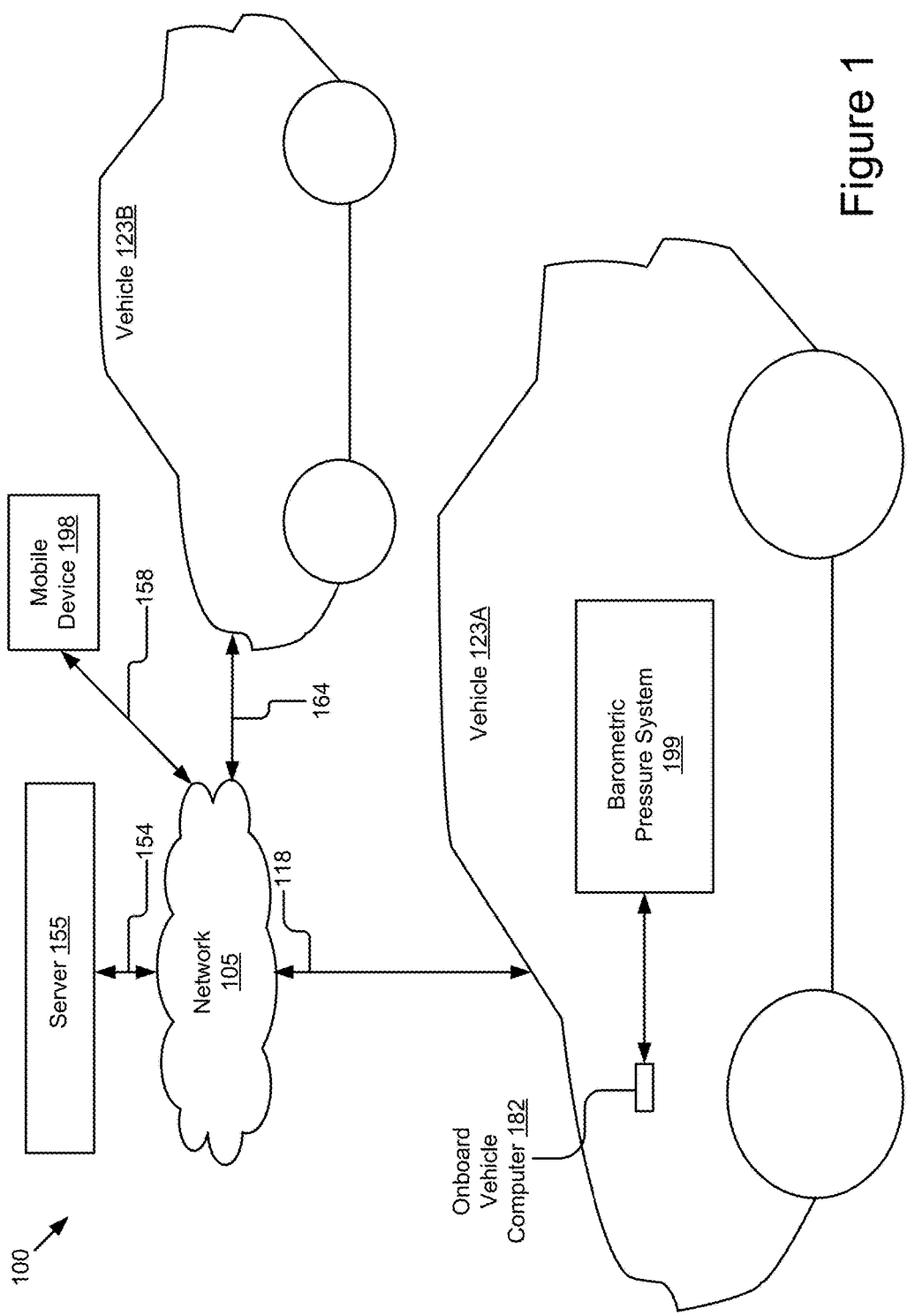
FIG. 1 is a block diagram illustrating an example operating environment for providing the barometric pressure system.

A mobile computer atmospheric barometric pressure system (herein "the system" or "the barometric pressure system") described according to some implementations. The barometric pressure system may be an element of a vehicle or a mobile device.

The vehicle may include a special-purpose computing device. For example, the vehicle may include an onboard vehicle computer that includes hardware and software specially designed and manufactured to meet the needs of the onboard vehicle computer so that the vehicle provides a safe and desirable user experience that conforms to federal and local regulations (e.g., safety, air emissions, Federal Communication Commission regulation of wireless transmissions, etc.). In some implementations, the vehicle may include one or more onboard vehicle computers.

The mobile device may include a processor-based computing device. For example, the mobile device may include a smartphone, tablet computer, laptop, smartwatch, Internet-of-Things device, personal computer, stationary roadside device, etc. The mobile device may include a processor. The processor may be programmed to provide some or all of the functionality described herein with reference to the barometric pressure system. In this way, the mobile device may be a special-purpose computing device programmed to provide the functionality described herein with reference to the barometric pressure system. In some implementations, the mobile device may be a smartphone of a driver traveling in a vehicle.

The vehicle or the mobile device may include an alarm system. The alarm system may include a processor based computing device or be an element of a processor based computing device. For example, the alarm system may be an element of the onboard vehicle computer. The alarm system may also be an element of a smartphone or some other mobile device.

The vehicle or mobile device may include a sensor set. The sensor set may include one or more electronic sensor devices. The electronic sensor devices of the sensor set may include electronic devices configured to record physical measurements of the environment of the alarm system. For example, the sensor set may include one or more barometric pressure sensors, one or more accelerometers, one or more humidity sensors, one or more temperature sensors, one or more cameras one or more roadway imaging devices, etc. The roadway imaging device may include one or more depth cameras. An example of a depth camera includes a light detection and ranging camera (a LIDAR camera).

The alarm system may be communicatively coupled to the sensor set. For example, the alarm system may be an element of a vehicle and the alarm system and the sensor set may each be communicatively coupled to a bus, and the bus may be communicatively coupled to the onboard computer of the vehicle. In another example, the alarm system may be an element of a mobile client, the sensor set may be an element of a vehicle and the sensor set may be communicatively coupled to the mobile client via a wireless network such as Wi-Fi, Bluetooth™, Bluetooth LE™, or any other wireless communicative coupling. In yet another example, the alarm system and the sensor set are elements of the vehicle and the barometric pressure system is an element of the mobile client. The sensor set and the alarm system may be communicatively coupled to the onboard vehicle computer of the vehicle via a bus. The sensor set, alarm system or the onboard vehicle computer may be communicatively coupled to the mobile client via a wireless network such as Wi-Fi, Bluetooth™, Bluetooth LE™, or any other wireless communicative coupling.

In some implementations, the alarm system is configured to analyze sensor data and determine whether the vehicle or the mobile device is on a trajectory that will result in a collision with an object on the roadway. The sensor data may include data describing measurements detected and recorded by one or more electronic sensor devices of the vehicle or the mobile device. The object may be another vehicle or any other object on the roadway. The alarm system is configured to provide a collision threat alarm to a driver of the vehicle or a user of the mobile device. The alarm system may provide the collision threat alarm if the vehicle or the mobile device is determined to be on a trajectory that will result in a collision.

The collision threat alarm may include providing an audible signal to the driver (or the user), a visual signal to the driver (or the user) or a combination of an audible and visual signal to the driver (or the user). Proving the collision threat alarm to the driver (or the user) may be referred to as a collision threat alarm incident.

The barometric pressure system may be configured to improve the performance or operation of the alarm system. For example, assume that the barometric pressure system is an element of a vehicle. The sensor set of the vehicle may include a global positioning system (GPS or GPS system), a speedometer, an accelerometer, a clock, etc. The sensor data may include data describing the location, speed and trajectory of the vehicle at a specified time. The sensor data may also include data describing the location, speed and trajectory of the object on the roadway. The sensor data may include motion data indicating the latitude and longitude coordinates of the vehicle and the object as indicated by one or more GPS systems of the vehicle or the object. The alarm system may analyze the sensor data and determine that a collision will occur between the vehicle and the object. However, the latitude and longitude data do not indicate the relative altitude of the vehicle and the object. If the vehicle is driving on a surface road and the object is driving on an overpass directly above the vehicle, the latitude and longitude data may indicate that the vehicle and the object are on a collision course with one another. In these situations the alarm system provides a collision threat alarm. However, this collision threat alarm is erroneous because the vehicle and the object are located at different altitudes, and so, the vehicle and the object will not collide with one another. The barometric pressure system described herein improves the performance of the alarm system by ensuring that such erroneous alarms do not occur.

For example, the barometric pressure system may include a barometric pressure sensor to measure and record the barometric pressure for the vehicle. The barometric pressure indicates the altitude of the vehicle. Forces such as acceleration of the vehicle may cause the reading of the barometric pressure to be inaccurate. The barometric pressure system may include electronic sensor devices to record the acceleration or roadway noise. The barometric pressure system may include processors that are programmed to adjust the measured barometric pressure to account for these forces and achieve an accurate measurement of the barometric pressure. The adjusted measurement of the barometric pressure may be referred to herein as an "acceleration-adjusted reading of the barometric pressure," an "acceleration-adjusted reading of the first barometric pressure," an "acceleration-adjusted reading of the second barometric pressure" or some similar terminology.

Other forces which may be measured and adjusted for include roadway noise. The roadway noise may include the noise and vibration caused by nearby vehicles that are passing the vehicle. For example, the roadway noise may include the noise and vibration caused in a smaller vehicle when a heavy truck passes the smaller vehicle.

Other forces may be measured and accounted for when adjusting the data describing the reading of the barometric pressure. For example, the vehicle may include one or more windows. One or more of these windows may be open. An open window increases the wind inside the cabin of the vehicle, thereby changing the vehicle cabin and the measurements for sensors included in the vehicle. The amount of wind inside the vehicle may be related to (or proportional to) the number of open windows or the degree to which the one or more windows are open, and a corresponding increase in the vehicle cabin noise. Other vehicle ventilation systems (e.g., a vehicle air condition system, a vehicle sunroof or moonroof, etc.) also cause vehicle cabin noise. A processor of the barometric pressure system (or the onboard vehicle computer) may access the vehicle bus to retrieve one or more of the following: (1) action data describing commands to lower or raise vehicle windows, open or close a vehicle sunroof or moonroof, or turn on a vehicle air condition system or vehicle ventilation system; and (2) state data describing a degree to which a window is open, a degree to which a sunroof or moonroof is open, or a fan setting for a vehicle air condition system and whether the air condition system is configured to allow fresh air into the vehicle or recirculate the vehicle cabin air (recirculating vehicle cabin air corresponds to an increase in wind noise inside the vehicle cabin). The action data and the state data may be stored in a non-transitory memory of the vehicle that is communicatively coupled to the vehicle bus. The barometric pressure system may determine adjustments for the barometric pressure data based at least in part on one or more of the action data and the state data. For example, the barometric pressure system may use one or more noise models to adjust for the effect of the vehicle cabin noise on the measurements of the vehicle sensors (e.g., one or more barometric pressure sensors).

Adjustments for noise caused by vehicle acceleration and ventilation is not performed by prior art barometric pressure systems. Moreover, the ability to determine accurate relative barometric pressure measurements and adjust the measurement based on vehicle acceleration and ventilation is beyond the ability of a human. For example, these relative barometric pressure measurements must be made and adjusted in real time or near real time (e.g., within one tenth of a second) in order to prevent a safety hazard. A human may require several minutes to make and adjust these relative barometric pressure measurements. Such human-based calculations would render the system inoperable because too much time would be required to enable the systems to determine whether alarm should be suppressed before vehicles either collided or drove past one another. Federal and state agencies will not allow such systems to be deployed because they would not meet minimum vehicle safety guidelines. Some embodiments of the barometric pressure system may not require wireless transmission of data among two or more objects. For example, the barometric pressure system may be an element of a mobile device. The mobile device may include a memory storing sensor data (e.g., barometric pressure data, location data describing the location of the mobile device, acceleration data describing the acceleration of the mobile device and inertia data describing the inertia of the mobile device), action data and state data. The barometric pressure data may be adjusted based on one or more of the acceleration data, the inertia data, the action data and the state data.

Some embodiments of the barometric pressure system may not require wireless transmission of data among two or more objects. For example, the barometric pressure system may be an element of a mobile device. The mobile device may include a memory storing sensor data (e.g., barometric pressure data, location data describing the location of the mobile device, acceleration data describing the acceleration of the mobile device and inertia data describing the inertia of the mobile device), action data and state data. The barometric pressure data may be adjusted based on one or more of the acceleration data, the inertia data, the action data and the state data.

Example System Overview

FIG. 1 is a block diagram illustrating an example operating environment 100 for providing the barometric pressure system 199 according to some implementations. In the illustrated embodiment, the environment 100 includes the following elements: a first vehicle 123A; a second vehicle 123B; a mobile device 198; and a server 155. In the illustrated embodiment, these entities of the environment 100 may be communicatively coupled via a network 105. The first vehicle 123A and the second vehicle 123B may be referred to individually as "the vehicle 123" or collectively as "the vehicles 123."

While FIG. 1 illustrates two vehicles 123, one mobile device 198, one server and one network, this disclosure may apply to an embodiment including three or more vehicles 123, two or more mobile devices 193 and two or more servers 155. Furthermore, although FIG. 1 illustrates one network 105 coupled to the entities of the environment 100, in practice one or more networks 105 may be connected to these entities. While FIG. 1 includes one barometric pressure system 199 as an element of the first vehicle 123A, in practice the environment 100 may include two or more barometric pressure systems 199. For example, two or more of the first vehicle 123A, the second vehicle 123B and the mobile client 198 may include one or more barometric pressure systems 199.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data via short messaging service (SMS), multimedia messaging service (MMS), hypertext transfer protocol (HTTP), direct data connection, WAP, e-mail, etc. In some implementations, the network 105 may include a GPS satellite for providing GPS navigation to the vehicle 123. The network 105 may be a mobile data network such as 3G, 4G, LTE, Voice-over-LTE ("VoLTE"), DSRC, or any other mobile data network or combination of mobile data networks.

The vehicle 123 may include an automobile, a bus, an airplane, a boat, or other vehicular conveyance. The vehicle 123 may be an electric vehicle or a hybrid vehicle. The vehicle 123 may include an internal combustion engine. The vehicle 123 may include a hydrogen fuel cell vehicle. In some implementations, the vehicle 123 may include an autonomous vehicle or a semi-autonomous vehicle 123. In some implementations, the vehicle 123 may include a semi-autonomous vehicle 123 in which the vehicle 123 controls at least part of the steering functionality of the vehicle 123. In the illustrated example, the first vehicle 123A is communicatively coupled to the network 105 via signal line 118 and the second vehicle 123B is communicatively coupled to the network 105 via signal line 164.

The vehicle 123 may include one or more of the following elements: an onboard vehicle computer 182; and a barometric pressure system 199. The vehicle 123 may include other elements described below with reference to FIG. 2A.

The onboard vehicle computer 182 may include a non-transitory memory and a processor. The onboard vehicle computer 182 may include a special-purpose computing device. The onboard vehicle computer 182 may be communicatively coupled to the barometric pressure system 199.

The barometric pressure system 199 may include a computing device. The barometric pressure system 199 may include a non-transitory memory and a processor. The barometric pressure system 199 may include code and routines configured to provide the functionality described herein. For example, the code and routines of the barometric pressure system 199 may be stored on the non-transitory memory and executed by the processor. The processor of the barometric pressure system 199 may be programmed using the code and routines and configured to provide the functionality described herein. The barometric pressure system 199 will be described in more detail below with reference to FIG. 2A.

In some implementations, the barometric pressure system 199 may be implemented using hardware including a field-programmable gate array ("FPGA") or an application-specific integrated circuit ("ASIC"). In some other implementations, the barometric pressure system 199 may be implemented using a combination of hardware and software. The barometric pressure system 199 may be stored in a combination of the devices and servers, or in one of the devices or servers.

The server 155 may be a hardware server that includes a processor, a memory and network communication capabilities. The barometric pressure system 199 may transmit data to the server 155. The barometric pressure system 199 may receive data from the server 155. For example, the server 155 may aggregate barometric pressure sensor data received from one or more barometric pressure systems 199. The server 155 may include a mapping service. The mapping service may include code and routines configured to generate one or more maps describing the barometric pressure.

For example, a fleet including a plurality of vehicles 123 may each include a barometric pressure system 199. The barometric pressure systems 199 may transmit: (1) location data describing one or more locations; and (2) barometric pressure data describing the altitudes associated with the one or more locations described by the location data. The barometric pressure data may be adjusted to account for the acceleration or other forces affecting the measurement of the barometric pressure such as humidity or temperature. The server 155 may receive the data from the barometric pressure systems 199 and generate altitude map data describing an altitude map for a geographic area. The altitude map may include a plurality of locations included in the geographic area. The altitude map data may also describe a plurality of altitudes associated with the plurality of locations included in the geographic area.

In some implementations, the barometric pressure system 199 of each vehicle 123 may communicate with other vehicles 123 via a network 105 such as DSRC and each barometric pressure system 199 may generate their own altitude map data.

The server 155 may be communicatively coupled to the network 105 via a signal line 154.

The mobile device 198 may include a processor-based computing device. For example, the mobile device 198 may include a smartphone, tablet computer, laptop, smartwatch, Internet-of-Things device, personal computer, stationary roadside device, etc. The mobile device may include a barometric pressure system 199. The mobile device 198 may include a processor. The processor may be programmed to provide some or all of the functionality described herein with reference to the barometric pressure system 199. In this way, the mobile device 198 may be a special-purpose computing device programmed to provide the functionality described herein with reference to the barometric pressure system 199. The mobile device 198 may be communicatively coupled to the network 105 via a signal line 158.

Example Electronic Device

FIG. 2A is a block diagram illustrating an example barometric pressure system 200. The barometric pressure system 200 may be an element of one or more of the vehicle 123 or the mobile device 198. The barometric pressure system 200 is an embodiment of the barometric pressure system 199 described above with reference to FIG. 1. In some implementations, the barometric pressure system 200 may include a special-purpose computing device configured to provide some or all of the functionality described below with reference to the barometric pressure system 199.

The barometric pressure system 200 may include one or more of the following elements: the barometric pressure module 201; the calibration module 210; the onboard vehicle computer 182; the processor 225; the communication unit 245; the alarm system 250; the sensor set 252; the vehicle steering system 254; and the memory 227.

The onboard vehicle computer 182 was described above with reference to FIG. 1, and so, this description will not be repeated here.

The calibration module 210 is communicatively coupled to the bus 220 via signal line 230. The onboard vehicle computer 182 is communicatively coupled to the bus 220 via signal line 232. The processor 225 is communicatively coupled to the bus 220 via signal line 234. The memory 227 is communicatively coupled to the bus 220 via the signal line 236. The communication unit 245 is communicatively coupled to the bus 220 via signal line 238. The alarm system 250 is communicatively coupled to the bus 220 via signal line 240. The sensor set 252 is communicatively coupled to the bus 220 via signal line 242. The vehicle steering system 254 is communicatively coupled to the bus 220 via signal line 244. In some implementations, one or more of the elements of the barometric pressure system 200 may share a signal line for communication with the bus 220.

The calibration module 210 may include code and routines configured to calibration one or more of the electronic sensor devices included in the sensor set 252. For example, assume the barometric pressure system 200 is an element of a first vehicle 123A. The barometric pressure system 200 may receive barometric pressure data from a second vehicle 123B which is known to be located at substantially the same altitude as the first vehicle 123A. The calibration module 210 may determine that the barometric pressure data recorded by the first vehicle 123A describes a barometric pressure reading that is different from the barometric pressure reading received from the second vehicle. Over a period of time a pattern in the delta between the barometric pressure readings of the first vehicle 123A and other devices may be observed by the calibration module 210. The calibration module 210 may determine that one or more of the electronic sensor devices included the sensor set 252 will be calibrated based on the pattern.

The calibration module 210 may determine that an electronic sensor device will be calibrated based on the quality data 297 stored in the memory 227. The quality data 297 may describe time to live data or time since calibration data. For example, the calibration module 210 may determine that one or more of the electronic sensor devices included the sensor set 252 will be calibrated based on one or more of the following: (1) time to live data associated with the electronic sensor devices and describing an estimate of how long the plurality of electronic sensor devices are estimated to live; and (2) time since calibration data associated with the plurality of electronic sensor devices and describing how long since the plurality of electronic sensor devices was calibrated.

In one embodiment, the calibration module 210 may provide the driver with a notification to service one or more of the electronic sensor devices of the sensor set 252. For example, the calibration module 210 may provide a signal to the onboard vehicle computer 182 indicating that one or more of the electronic sensor devices may be calibrated. The onboard vehicle computer 182 may cause a light on the dash of the vehicle 123 to indicate that one or more of the electronic sensor devices may be calibrated. Optionally, the onboard vehicle computer 182 may cause an infotainment system of the vehicle 123 to provide an auditory, visual or audio-visual indication that that one or more of the electronic sensor devices may be calibrated.

The processor 225 includes an arithmetic logic unit, a microprocessor, a general-purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2A includes a single processor 225, multiple processors 225 may be included. The processor 225 may include a graphical processing unit. Other processors, operating systems, electronic sensor devices, displays, and physical configurations may be possible.

The memory 227 is a tangible storage medium that stores instructions or data that may be accessed and executed by the processor 225. The instructions or data may include code for performing the techniques described herein. The memory 227 may include a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 245 may include hardware that transmits and receives data to and from the network 105. In some implementations, the communication unit 245 includes a port for direct physical connection to the network 105 or to another communication channel. For example, the communication unit 245 includes a USB, SD, CAT-5, or similar port for wired communication with the network 105.

In some implementations, the communication unit 245 includes a wireless transceiver for exchanging data with the network 105 or other communication channels using one or more wireless communication methods, including IEEE 802.11, IEEE 802.16, Bluetooth®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc. The communication unit 245 may also provide connections to the network 105 for distribution of files, media objections or messages using the DSRC protocol.

The alarm system 250 may include hardware and software for providing a collision threat alarm to a driver of a vehicle 123 or the user of a mobile device 198. The alarm system 250 may include a processor based computing device or be an element of a processor based computing device. For example, the alarm system 250 may be an element of the onboard vehicle computer 182 or the barometric pressure system 200. Optionally, the alarm system 250 may be an element of a smartphone or some other mobile device 198.

In some implementations, the alarm system 250 is configured to analyze data stored on the memory 227 and determine whether the vehicle 123 or the mobile device 198 is on a trajectory that will result in a collision with an object on the roadway. The data stored on the memory 227 may include data describing measurements detected and recorded by one or more electronic sensor devices of the sensor set 252. The object may be another vehicle 123 or any other object on the roadway. The memory 227 may store, for example, action data and state data.

The alarm system 250 is configured to provide a collision threat alarm to a driver of the vehicle 123 or a user of the mobile device 198. The alarm system 250 may provide the collision threat alarm if the vehicle 123 or the mobile device 198 is determined by the alarm system 250 to be on a trajectory that will result in a collision. The collision threat alarm 250 may include providing an audible signal to the driver (or the user), a visual signal to the driver (or the user) or a combination of an audible and visual signal to the driver (or the user). Proving the collision threat alarm to the driver (or the user) may be referred to as a collision threat alarm incident.

The barometric pressure system 200 may include code and routines configured to improve the performance or operation of the alarm system 250. For example, assume that the barometric pressure system 200 is an element of a vehicle 123. The data stored on the memory 227 may include data describing the location, speed and trajectory of the vehicle 123 at a specified time. The data stored on the memory 227 may also include data describing the location, speed and trajectory of the object on the roadway. The data stored on the memory 227 may include location data 284 indicating the latitude and longitude coordinates of the vehicle 123 and the object as indicated by one or more GPS systems (e.g., a GPS system of the vehicle 123 and a GPS system of the object). The alarm system 250 may analyze the data stored on the memory 227 and determine that a collision will occur between the vehicle 123 and the object. However, the latitude and longitude described by the location data 284 does not indicate the relative altitude of the vehicle 123 and the object. If the vehicle 123 is driving on a surface road and the object is driving on an overpass directly above the vehicle 123 and the surface road, the latitude and longitude described by the location data 284 may indicate that the vehicle 123 and the object are on a collision course with one another. In these situations, alarm systems 250 which are not improved by the barometric pressure system 200 will provide collision threat alarm. However, this collision threat alarm is erroneous because the vehicle 123 and the object are located at different altitudes, and so, the vehicle 123 and the object will not collide with one another. The barometric pressure system 200 described herein improves the performance of the alarm system 250 by ensuring that such erroneous alarms do not occur.

For example, the sensor set 252 may include a barometric pressure sensor to measure and record the barometric pressure for the vehicle 123. The barometric pressure may indicate the altitude of the vehicle 123. Forces such as acceleration of the vehicle 123 may cause the reading of the barometric pressure recorded by the barometric pressure sensor to be inaccurate. The sensor set 252 may include one or more electronic sensor devices to record the acceleration of the vehicle 123 or roadway noise. The processor 225 may be programmed by the barometric pressure system 200 to adjust the measured barometric pressure to account for these forces and achieve an accurate measurement of the barometric pressure. The adjusted measurement of the barometric pressure may be referred to herein as an "acceleration-adjusted reading of the barometric pressure," an "acceleration-adjusted reading of the first barometric pressure," an "acceleration-adjusted reading of the second barometric pressure" or some similar terminology.

The barometric pressure system 200 may also program the processor 225 to measure and adjust the barometric pressure data for roadway noise. The roadway noise may include the noise and vibration caused by nearby vehicles 123 that are passing the vehicle 123 which includes the barometric pressure system 200. For example, the roadway noise may include the noise and vibration caused in a smaller vehicle when a heavy truck passes the smaller vehicle.

The sensor set 252 may include one or more electronic sensor devices. The electronic sensor devices of the sensor set 252 may include electronic devices configured to record physical measurements of the environment of the alarm system 250. For example, the sensor set 252 may include one or more barometric pressure sensors, one or more accelerometers, one or more humidity sensors, one or more temperature sensors, one or more cameras one or more roadway imaging devices, etc. The roadway imaging device may include one or more depth cameras. An example of a depth camera includes a light detection and ranging camera (a LIDAR camera). The data describing the measurements of the sensor set 252 may be referred to generally as "sensor data." The memory 227 stores the sensor data. Data 280, 282, 284, 286, 288, 290 and 297 are examples of sensor data.

The vehicle steering system 254 may include hardware, code and routines configured to steer a vehicle 123. For example, the vehicle 123 may be an autonomous vehicle or a semi-autonomous vehicle. The vehicle steering system 254 may steer the vehicle based at least in part on the sensor data stored on the memory 227.

The memory 227 may store one of more of the following: environment data 280; altitude map data 282; location data 284; object data 286; trajectory data 288; motion data 290; quality data 297; and altitude separation data 298. The memory 227 may also store action data and state data (not pictured).

The environment data 280 may include data describing measurements of one or more physical attributes of the environment of the vehicle 123 or the mobile device 198. The measurements may be recorded by one or more electronic sensor devices of the sensor set 252. For example, the environment data 280 may describe one or more of the following: a barometric pressure measurement; a temperature measurement; an altitude estimate; a measurement of humidity; an adjusted estimate of the altitude based on the temperature, acceleration or humidity; one or more roadway images or image depth estimates for the one or more roadway images. The environment data 280 is described in more detail below with reference to FIG. 2B.

The altitude map data 282 may describe an altitude map. The altitude map described by the altitude map data 282 may include an altitude map for a geographic area and a plurality of altitudes associated with a plurality of locations included in the geographic area. For example, the altitude map may describe (1) one or more locations in the city of Los Altos Hills, Calif. and (2) one or more altitude estimates or barometric pressure readings associated with the one or more locations.

The one or more locations may include any GPS coordinates, latitude and longitude coordinates, coordinates determined by wireless signal triangulation, etc. The one or more locations may include points of interest along a travel route provided by a navigation system. The one or more locations may include points of interest along a travel route for a commute.

The points of interest may include one or more of the following: a business location; a traffic light; a stop sign; and geographical points where there is a statistically significant change in the barometric pressure measurement or altitude estimate.

The location data 284 may describe the geographic location of the vehicle 123 or the mobile device 198. For example, if the barometric pressure system 200 is an element of a vehicle 123, then the location data 284 may describe the geographic location of the vehicle 123. The location data 284 may be retrieved via the network 105. The location data 284 may be stored in the memory 227 or provided to the communication module 202. The sensor set 252 may include a GPS system. The GPS system may include hardware configured to provide satellite navigation. The GPS system may be an element of the communication unit 245.

The location data 284 may describe one or more of the following: the geographic location of the vehicle 123 or the mobile device 198; the time associated with the determination of the geographic location; and weather data describing the weather conditions (e.g., weather forecast, humidity, temperature) present at the geographic location for the current time. The geographic location may be described by Cartesian coordinates based on an origin present at the center of the earth. The geographic location may be the output of one or more global navigation satellite system (GNSS) positioning calculations.

The object data 286 describes data received via the network 105. For example, the object data 286 may include data transmitted by an object to the network 105. The object may be a second vehicle 123 or a mobile client 198 (including a stationary roadside device). The object data 286 may describe a location, sensor data recorded by electronic sensor devices of the object and a timestamp associated with the location and the sensor data. The sensor data included in the object data 286 may include a barometric pressure measurement, a humidity measurement, a temperature measurement, an acceleration measurement, or a barometric pressure measurement that is adjusted for one or more of humidity, temperature and acceleration.

The trajectory data 288 may describe the trajectory of the vehicle or the mobile device 198. For example, the barometric pressure system 200 is an element of the vehicle 123. The location data 284 may describe the location of the vehicle 123 at a given time. The vehicle may be traveling with at a determined velocity and acceleration (as described below with reference to the motion data 290). The trajectory data 288 may describe the trajectory of the vehicle 123. The trajectory of the vehicle 123 or the mobile phone 198 may include the path followed by the vehicle of the mobile phone 198 under action of given forces such as velocity and acceleration.

The motion data 290 may describe the physical motion of the vehicle 123 or the mobile device 198. The motion data 290 may describe one or more physical forces applied to the vehicle 123 or the mobile device 198. For example, the barometric pressure system 200 is an element of the vehicle 123. The motion data 290 may include data describing one or more of the following: an axis of rotation of the vehicle 123; an acceleration of the vehicle 123; a velocity of the vehicle 123; a moment force applied to the vehicle 123; and any other measurable force applied to the vehicle 123.

The sensor set 252 may include any electronic sensor devices needed to measure the motion data 290. For example, the sensor set 252 may include one or more of the following: a gyroscopic sensor, an accelerometer; a barometric pressure sensor; a torque sensor; a force transducer; a plate force sensor; an odometer; an impact sensor; a strain gauge; an angular position sensor; a rotary transformer and one or more slip rings; a tilt sensor; a velocity receiver; a shock detector and shock data logger; a synchro transducer; an integrated circuit piezocapacitve sensor; a gravimeter; an inclinometer; and a 6-axis force/moment sensor.

The motion data 290 is described in more detail below with reference to FIG. 2C.

The quality data 297 may describe (1) the quality or state of one or more of the electronic sensor devices included in the sensor set 252 or (2) the quality or state of the sensor data.

The quality data 297 may also describe a delta between an altitude estimate determined by the barometric pressure system 200 and an altitude determined by some other electronic device. For example, assume the barometric pressure system 200 is an element of a first vehicle 123A. The barometric pressure system 200 may receive barometric pressure data from a second vehicle 123B which is known to be located at substantially the same altitude as the first vehicle 123A. The calibration module 210 may determine that the barometric pressure data recorded by the first vehicle 123A describes a barometric pressure reading that is different from the barometric pressure reading received from the second vehicle 123B. The calibration module 210 may store quality data 297 in the memory 227 describing the delta between the barometric pressure data recorded by the first vehicle 123A and the barometric pressure reading received from the second vehicle 123B. The calibration module 210 may repeat this process for other combinations of barometric pressure data. Over a period of time a pattern in the delta between the barometric pressure readings of the first vehicle 123A and other devices may be observed or determined by the calibration module 210. The calibration module 210 may determine that one or more of the electronic sensor devices included the sensor set 252 will be calibrated based on the pattern. For example, if the average delta is some positive value indicated by "X," then the barometric pressure data recorded by the barometric pressure system will be increased by "X" to account for the pattern in the delta. Optionally, the value of "X" may be used by the calibration module 210 to electronically calibrate one or more of the barometric pressure sensors included in the sensor set 252.

In some implementations, the calibration module 210 may also apply Winsorising outlier filtering techniques to determine the value of "X" used to adjust the barometric pressure data so that statistically significant outliers do not affect the value of "X."

In some implementations, the quality data 297 may include time to live data or time since calibration data. Optionally, each instance of the time to live data or the time since calibration data may be associated with a particular electronic sensor device. One or more instances of the time to live data or the time since calibration data may be included in the quality data 297.

The time to live data may describe, for a given electronic sensor device included in the sensor set 252, an estimate of how long the electronic sensor device 252 is estimated to live. For example, the electronic sensor device may have a known or estimated life cycle. The service time for the electronic sensor device may be tracked and known. The service time may describe how much time the electronic sensor device has been in service. The service time may be included in the time to live data. The time to live data may be determined by subtracting the estimated life cycle of the electronic sensor device from the service time for the electronic sensor device.

The time since calibration data may describe, for a given electronic sensor device, how long since the electronic sensor device was calibrated. The time since calibration data may also describe how frequently the electronic sensor device is calibrated according to the specification for the electronic sensor device. If the time since calibration exceeds the frequency indicated by the specification, then the calibration module 210 determines to calibrate the electronic sensor device.

The altitude separation data 298 describes an altitude separation for two objects. The altitude separation includes a difference in the altitude of two objects. For example, assume that a first vehicle 123A is traveling on a roadway having an altitude of "X" and a second vehicle 123B is traveling on a roadway having an altitude of "Y." Further assume that "Y" is greater than "X." The altitude separation data 298 describes the difference in altitude for the first vehicle 123A and the second vehicle 123B. In this example, the altitude separation is the difference between "Y" and "X" (e.g., Y−X=altitude separation). An example of altitude separation is described below with reference to FIG. 3.

The altitude separation data 298 is determined by the analysis module 208 based on differential barometric pressure data (not pictured) stored in the memory 227. The differential barometric pressure data may describe a differential barometric pressure for two objects. For example, the barometric pressure system 200 is an element of a first vehicle 123A. The environment data 280 may include first barometric pressure data describing the barometric pressure measured in a column of air above the first vehicle 123A. The object data 286 may include second barometric pressure data describing the barometric pressure measured in a column of air above a second vehicle 123B. The analysis module 208 may include code and routines configured to determine the differential barometric pressure. For example, the differential barometric pressure for the first vehicle 123A and the second vehicle 123B is determined by subtracting (1) the lesser of the first barometric pressure data and the second barometric pressure data from (2) the greater of the first barometric pressure data and the second barometric pressure data.

The analysis module 208 may include code and routines configured to determine an estimate of the altitude separation between two objects based on the differential barometric pressure data. The memory 227 may include a data structure used by the analysis module 208 to determine the altitude separation estimate for two objects based on the differential barometric pressure for these two objects. For example, assuming a temperature of 60 degrees Fahrenheit, our experimentation has shown each 1 millibar unit of differential barometric pressure at sea level corresponds to an estimated altitude separation of 27.4 feet. The analysis module 208 may determine that a differential barometric pressure of 3 millibars at 60 degrees Fahrenheit corresponds to an altitude separation of 82.2 feet (27.4 feet/millibar multiplied by 3 millibars).

The memory 227 may include other data used to determine an estimate of the altitude separation between two objects based on the differential barometric pressure data. For example, assuming a temperature of 20 degrees Fahrenheit, our experimentation has shown that each 1 millibar unit of differential barometric pressure at sea level corresponds to an estimated altitude separation of 25 feet. In another example, assuming a temperature of 60 degrees Fahrenheit, our experimentation has shown that each 1 millibar unit of differential barometric pressure at 7,000 feet above sea level corresponds to an estimated altitude separation of 33 feet. FIGS. 10A and 10B include data that may be stored in the memory 227 and used by the analysis module 208 to convert differential barometric pressure to altitude separation estimates.

In some implementations, the memory 227 may store a lookup table describing acceptable differential barometric pressures. For example, the analysis module 208 may determine the differential barometric pressure for two objects. The analysis module 208 may query the lookup table stored in the memory 227. If the query returns a non-empty result or a result other than null, then the analysis module 208 may determine that the estimated altitude separation is greater than zero. The analysis module 208 may determine that an estimated altitude separation greater than zero corresponds to suppression of a collision threat alarm since the two objects are not at the same altitude.

Differential barometric pressure is described in more detail below with reference to FIG. 3.

In some implementations, the memory 227 may store a distance coefficient. The analysis module 208 may apply the distance coefficient to the differential barometric pressure to determine the estimated altitude separation between the two objects. The distance coefficient may be configured to account for a worst case or typical scenario. For example, distance coefficient may be selected by the analysis module 208 from a range of 25 to 33 separation feet per millibar of differential barometric pressure. The analysis module 208 may select the distance coefficient based on sensor data or other factors applicable to the present use case scenario. For example, the analysis module may select a distance coefficient of 25 separation feet per millibar based on the sensor data including acceleration of one or more of the objects. The differential barometric pressure between the two objects may be 2 millibar. The analysis module 208 may determine that the estimated altitude separation is 50 feet (2 millibar multiplied by 25 separation feet per millibar). The analysis module 208 is described in more detail below with reference to the barometric pressure module 201.

In some implementations, the barometric pressure module 201 may include code and routines that are stored on the memory 227. In some implementations, the processor 225 may be programmed by the code and routines of the barometric pressure module 201. In some implementations, the code and routines of the barometric pressure module 201 may be stored in an on chip memory of the processor 225.

In some implementations, the barometric pressure module 201 includes one or more of the following elements: a communication module 202; a sensor module 204; an object-to-object communication module 206; and an analysis module 208.

The communication module 202 is communicatively coupled to the bus 220 via signal line 222. The sensor module 204 is communicatively coupled to the bus 220 via signal line 224. The object-to-object communication module 206 is communicatively coupled to the bus 220 via signal line 226. The analysis module 208 is communicatively coupled to the bus 220 via signal line 228. The bus 220 may include a vehicle bus.

The communication module 202 may include code and routines configured to handle communications between the application assurance system 199 and other components of the barometric pressure system 200. In some implementations, the communication module 202 can include a set of instructions executable by the processor 225 to provide the functionality described below for handling communications between the application assurance system 199 and other components of the barometric pressure system 200. In some implementations, the communication module 202 can be stored in the memory 227 of the barometric pressure system 200 and can be accessible and executable by the processor 225.

The communication module 202 sends and receives data, via the communication unit 245, to and from the network 105. For example, the communication module 202 receives, via the communication unit 245, location data 284 or object data 286 from the network 105.

In some implementations, the communication module 202 receives data from components of the barometric pressure system 200 and stores the data in the memory 227.

The sensor module 204 may include code and routines configured to cause one or more of the electronic sensor devices to measure one or more physical attributes and store sensor data in the memory 227.

The object-to-object communication module 206 may include code and routines configured to manage object-to-object communications for the barometric pressure system 200. For example, the object-to-object communication module 206 manages DSRC communications among two or more objects. The objects may include one or more of the following: a vehicle 123 or a mobile device 198 (including a stationary roadside device). The object-to-object communication module 206 may build a DSRC message to be transmitted by the communication unit 245 to an object. An example of a DSRC message is described below with reference to FIG. 11. The object-to-object communication module 206 may analyze received messages to determine their content. The object-to-object communication module 206 may store data included in received messages in the memory 227 as object data 286.

The analysis module 208 may include code and routines for analyzing the data stored in the memory 227 and making determinations based on the analysis. The determinations of the analysis module 208 may be configured to improve the performance of the alarm system 250.

The analysis module 208 may be described with reference to an object, a vehicle 123, a first vehicle 123A, a second vehicle 123B, a mobile device 198; a first mobile device 198 and a second mobile device 198. In some implementations, the description of the analysis module 208 may refer to systems including a plurality of barometric pressure systems 200. For example, the analysis module 208 may be described with reference to a system that includes one or more objects, vehicles 123 or mobile devices 198 and one or more of these devices may include their own barometric pressure system 200. When describing the analysis module 208, the description may use the reference characters of FIG. 2A while using the words "first" and "second" to remove ambiguity about whether elements are components of the first vehicle 123A or the second vehicle 123B. For example, the first vehicle 123A may include a "first onboard vehicle computer 182" and the second vehicle 123B may include a "second onboard vehicle computer 182." Similarly, the analysis module 208 may be described with reference to a system including multiple mobile devices 198, and these may be referred to as "a first mobile device 198," "a second mobile device 198" and etc. Example implementations of the analysis module 208 will now be described.

In some implementations, the determinations of the analysis module 208 may be configured to suppress an erroneous collision threat alarm. For example, the analysis module 208 may include code and routines configured to estimate an altitude separation for two or more objects. The analysis module 208 may include code and routines configured to suppress a collision threat alarm of the alarm system 250 based on the estimate of altitude separation.

For example, assume that the barometric pressure system 200 is an element of a vehicle 123. The sensor data may include data describing the location, speed and trajectory of the vehicle 123 at a specified time. The sensor data may also include data describing the location, speed and trajectory of an object on the roadway. The sensor data may include location data indicating the latitude and longitude coordinates of the vehicle 123 and the object as indicated by one or more GPS systems. The alarm system 260 may analyze the sensor data and determine that a collision will occur between the vehicle and the object. However, the latitude and longitude data do not indicate the relative altitude of the vehicle and the object. If the vehicle 123 is driving on a surface road and the object is driving on an overpass directly above the vehicle 123 and the surface road (so that the overpass is at a higher altitude), the latitude and longitude data may indicate that the vehicle 123 and the object are on a collision course with one another. In these situations the alarm system 250 provides a collision threat alarm. However, this collision threat alarm is erroneous because the vehicle 123 and the object are located at different altitudes, and so, the vehicle 123 and the object will not collide with one another.

The alarm system 250 may provide a signal to the communication module 202 indicating the potential collision threat alarm incident. The communication module 202 may provide the signal to the analysis module 208. The analysis module 208 may include code and routines configured to perform one or more of the following steps responsive to receipt of the signal indicating the potential collision threat alarm: (1) analyze the sensor data stored on the memory 227; (2) determine an estimate of the altitude separation between the vehicle 123 and the object based on the sensor data; (3) store altitude separation estimate data 298 in the memory 227 describing the altitude separation; (5) determine that the potential vehicle threat alarm would be erroneous based on the altitude separation data 298 indicating that the vehicle and the object are at different altitudes; and (6) suppress the collision threat alarm so that the alarm system 250 does not provide the collision threat alarm to the driver. In this way, the barometric pressure system 200 described herein improves the performance of the alarm system 260 by ensuring that such erroneous alarms do not occur.

For example, the sensor set 252 of the barometric pressure system 200 may include one or more barometric pressure sensors to measure and record the barometric pressure for the vehicle 123. The barometric pressure indicates the altitude of the vehicle. Forces such as acceleration of the vehicle may cause the reading of the barometric pressure to be inaccurate. The sensor set 252 of the barometric pressure system 200 may include one or more electronic sensor devices to record the acceleration (e.g., an accelerometer). The analysis module 208 may include code and routines configured to adjust the measured barometric pressure described by the barometric pressure data to account for acceleration to achieve a more accurate measurement of the barometric pressure versus not accounting for these forces. The adjusted measurement of the barometric pressure may be referred to herein as an "acceleration-adjusted reading of the barometric pressure," an "acceleration-adjusted reading of the first barometric pressure," an "acceleration-adjusted reading of the second barometric pressure" or some similar terminology based on the forces used to adjust the barometric pressure data. In one embodiment, the processor 225 is programmed by the code and routines of the analysis module 208 to determine the acceleration-adjusted barometric pressure based on the sensor data stored in the memory 227.

The analysis module 208 may include code and routines configured to account for other forces such as roadway noise. The roadway noise may include the noise and vibration caused by nearby vehicles that are passing the vehicle. For example, the roadway noise may include the noise and vibration caused in a smaller vehicle 123 when a heavy truck passes the smaller vehicle 123.

In some implementations, the barometric pressure system 200 includes a dedicated short range communication network (DSRC communication network). The barometric pressure system 200 may be an element of a first vehicle 123A. The first vehicle 123A may be communicatively coupled to a second vehicle 123B via the DSRC communication network. The second vehicle 123B may be traveling on a roadway in the same direction as the first vehicle 123A. The second vehicle 123B may be located in a different lane relative to the first vehicle 123A while still traveling in the same direction as the first vehicle 123A. For example, the first vehicle 123A may be located in the first lane or a northbound roadway. The second vehicle 123B may be located in the second lane of the same northbound roadway.

The first vehicle 123A and the second vehicle 123B may separately include some or all of the elements of the barometric pressure system 200 depicted in FIG. 2A.

The first vehicle 123A may include a set of first electronic sensor devices, a second electronic sensor device and a first onboard vehicle computer 182. The first electronic sensor devices may include a plurality of barometric pressure sensors configured to measure the barometric pressure and store the measurement in the memory 227 as barometric pressure data. The second electronic sensor device may include an accelerometer, an odometer or some other electronic sensor device configured to record the acceleration of the first vehicle 123A.

The second vehicle 123B may include an alarm system 250. The alarm system 250 may configured to analyze sensor data of the second vehicle 123B and determine whether the second vehicle 123B is on a trajectory that will result in the second vehicle 123B colliding with an object on the roadway. The object may be another vehicle (e.g., the first vehicle 123A) or any other object on the roadway. The alarm system 250 may be configured to provide a collision threat alarm to a driver of the second vehicle 123B if the second vehicle 123B is determined by the alarm system 250 to be on a trajectory that will result in the second vehicle 123B colliding with an object on the roadway.

The set of first electronic sensor devices of the first vehicle 123A may be configured to record first barometric pressure data describing a first barometric pressure associated with the first vehicle 123A. The first barometric pressure data may be stored in the memory 227 of the barometric pressure system 200. The second electronic sensor device of the first vehicle 123A may be configured to record acceleration data describing an acceleration of the first vehicle 123A. The acceleration data may be stored in the memory 227 of the barometric pressure system 200.

The first onboard vehicle computer 182 of the first vehicle 123A may be communicatively coupled to the DSRC communication network, the set of first electronic sensor devices and the second electronic sensor device. The first onboard vehicle computer 182 may be programmed by a first analysis module 208 of the first vehicle 123A to (1) adjust the first barometric pressure data based on the acceleration of the first vehicle 123A so that the first barometric pressure data describes an acceleration-adjusted reading of the first barometric pressure associated with the first vehicle 123A and (2) automatically transmit the first barometric pressure data describing the acceleration-adjusted reading to a selected channel of the DSRC communication network 182.

The second vehicle 123B may include a second onboard vehicle computer 182. The second onboard vehicle computer 182 is communicatively coupled to the selected channel of the DSRC communication network. The second onboard vehicle computer 182 is programmed by a second analysis module 208 of the second vehicle 123B to receive the first barometric pressure data describing the acceleration-adjusted reading. The second onboard vehicle computer 182 is programmed by the second analysis module 208 of the second vehicle 123B to determine an estimate of altitude separation based on the first barometric pressure data and second barometric pressure data describing a second barometric pressure associated with the second vehicle 123B.

The estimate of altitude separation may describe an estimate of whether the first vehicle 123A and the second vehicle 123B are located at substantially the same altitude. The second onboard vehicle computer 182 of the second vehicle 123B is programmed by the second analysis module 208 to suppress a collision threat alarm based on the estimate of altitude separation indicating that the first vehicle 123A and the second vehicle 123B are not located at substantially the same altitude.

In some implementations, the barometric pressure system 200 is an element of a mobile device 198. The barometric pressure system 200 may include: a network 105 communicatively coupled to the mobile device 198; a first electronic sensor device configured to record barometric pressure data describing a barometric pressure associated with the mobile device 198; a second electronic sensor device configured to record acceleration data describing an acceleration of the mobile device 198; and a processor 225 communicatively coupled to the network 106, the first electronic sensor device and the second electronic sensor device.

The processor 225 may be programmed by the analysis module 208 to adjust the barometric pressure data based on the acceleration of the mobile device 198 so that the barometric pressure data describes an acceleration-adjusted reading of the barometric pressure associated with the mobile device 198. The processor 225 may also be programmed by the analysis module 208 to automatically transmit the barometric pressure data describing the acceleration-adjusted reading to the network 105. The processor 225 may also be programmed by the analysis module 208 to transmit the barometric pressure data to the network 105 in substantially real time. For example, the processor 225 may be programmed to transmit the barometric pressure data to the network every 0.1 seconds. In some implementations, the processor 225 may also be programmed by the analysis module 208 to transmit the barometric pressure data to the network 105 at an interval configured by the processor 225 to avoid a collision threat alarm incident.

In some implementations, the barometric pressure system 200 is an element of a mobile device 198 including a network 105 communicatively coupled to the mobile device 198. The barometric pressure system 200 may include a set of first electronic sensor devices configured to record barometric pressure data describing a barometric pressure associated with the mobile device 198. The barometric pressure system 200 may include a second electronic sensor device configured to record acceleration data describing an acceleration of the mobile device 198. The barometric pressure system 200 may also include a processor 225 communicatively coupled to the network 105, the set of first electronic sensor devices and the second electronic sensor device.

The analysis module 208 of the barometric pressure system 200 may include code and routines configured to (1) determine quality data 297 describing a quality of the barometric pressure data and (2) adjust the barometric pressure data based on the quality of the barometric pressure data and the acceleration of the mobile device 198 so that the barometric pressure data describes a quality and acceleration-adjusted reading of the barometric pressure associated with the mobile device 198. The analysis module 208 may also include code and routines configured to automatically transmit the barometric pressure data describing the acceleration-adjusted reading to the network 105.

The processor 225 may be programmed by the analysis module 208 to (1) determine quality data describing a quality of the barometric pressure data and (2) adjust the barometric pressure data based on the quality of the barometric pressure data and the acceleration of the mobile device 198 so that the barometric pressure data describes a quality and acceleration-adjusted reading of the barometric pressure associated with the mobile device 198. The processor 225 is also programmed by the analysis module 208 to automatically transmit the barometric pressure data describing the acceleration-adjusted reading to the network 105.

In some implementations, the quality data 297 may be based on one or more of (1) time to live data associated with the set of first electronic sensor devices and describing an estimate of how long the set of first electronic sensor devices are estimated to live and (2) time since calibration data associated with the set of first electronic sensor devices and describing how long since the set of first electronic sensor devices was calibrated.

In some implementations, the barometric pressure system 200 may comprise a network 105 communicatively coupled to a first mobile device 198 and a second mobile device 198. The first mobile device 198 and the second mobile device 198 may each include a barometric pressure system 200.

The first mobile device 198 may include a set of first electronic sensor devices, a second electronic sensor device and a first processor 225. The set of first electronic sensor devices may be configured to record first barometric pressure data describing a first barometric pressure associated with the first mobile device 198. The second electronic sensor device may be configured to record acceleration data describing an acceleration of the first mobile device 198.

The first processor 225 may be communicatively coupled to the network 105, the set of first electronic sensor devices and the second electronic sensor device. The first processor 225 may be programmed by a first analysis module 208 to (1) adjust the first barometric pressure data based on the acceleration of the first mobile device 198 so that the first barometric pressure data describes an acceleration-adjusted reading of the first barometric pressure associated with the first mobile device 198 and (2) automatically transmit the first barometric pressure data describing the acceleration-adjusted reading to the network 105.

The second mobile device 198 may be communicatively coupled to the network 105 and configured to receive the first barometric pressure data describing the acceleration-adjusted reading from the network 105. A second processor 225 of the second mobile device 198 may be programmed by a second analysis module 208 to determine altitude separation estimate data 298 based on the first barometric pressure data and second barometric pressure data describing a second barometric pressure associated with the second mobile device 198. The altitude separation estimate data 298 may describe an estimate of whether the first mobile device 198 and the second mobile device 198 are located at substantially the same altitude. In some implementations, the altitude separation estimate data 298 may describe a delta in altitude for the first mobile device 198 and the second mobile device 198. In some implementations, at least one of the first mobile device 198 and the second mobile device 198 is a vehicle 123.

In some implementations, the first analysis module 208 of the first mobile device 198 may include code and routines configured to determine a first geographic location vector based on sensor data stored in the first memory 227 of the first mobile device 198. For example, the first analysis module 208 of the first mobile device 198 may determines the first geographic location vector based on (1) a first location of the first mobile device 198 at a first time, (2) a first speed (or velocity) of the first mobile device 198, (3) and a first direction of the first mobile device 198 and (4) the first barometric pressure data describing the acceleration-adjusted reading. The first geographic location vector may include vector data describing the location of the first mobile device 198 (e.g., the first location) at a first time (e.g., a specified time), the speed of the first mobile device 198, the direction of travel of the first mobile device 198 and the acceleration-adjusted reading of the barometric pressure associated with the first mobile device 198 while present at the location or substantially at the first location. The first mobile device 198 transmits the first geographical location vector to the network 105.

The second mobile device 198 may receive the first geographical location vector from the network 105. The second analysis module 208 of the second mobile device 198 may include code and routines configured to determine a second geographic location vector based on sensor data stored in the first memory 227 of the first mobile device 198. For example, the second analysis module 208 may determine the second geographic location vector based on (1) a second location of the second mobile device 198 at a second time, (2) a second speed of the second mobile device 198; (3) a second direction of the second mobile device 198; and (4) the second barometric pressure data associated with the second mobile device 198.

The second processor 225 of the second mobile device 198 may be programmed by the second analysis module 208 to determine a second geographic location vector based on (1) a second location of the second mobile device at a second time, (2) a second speed of the second mobile device; (3) a second direction of the second mobile device 198; and (4) the second barometric pressure data associated with the second mobile device 198.

The second geographic location vector may include vector data describing the location of the second mobile device 198 (e.g., the second location) at a second time (e.g., a specified time), the speed of the second mobile device 198, the direction of travel of the second mobile device 198 and the acceleration-adjusted reading of the barometric pressure associated with the second mobile device 198 while present at the location or substantially at the second location.

The second analysis module 208 may also include code and routines configured to determine an estimate of whether the first mobile device 198 and the second mobile device 198 will collide based on the first geographical location vector, the second geographical location vector and the estimate of altitude separation. The second processor 225 may be programmed by the second analysis module 208 to determine an estimate of whether the first mobile device 198 and the second mobile device 198 will collide based on the first geographical location vector, the second geographical location vector and the estimate of altitude separation.

In some implementations, the first geographical location vector and the second geographical location vector may indicate that the first mobile device 198 and the second mobile device 198 will collide but the second processor 225 of the second mobile device 198 determines that the first mobile device 198 and the second mobile device 198 will not collide based on a determination that the estimate of altitude separation indicates that the first mobile device 198 and the second mobile device 198 are not located at substantially the same altitude.

In some implementations, the second processor 225 of the second mobile device 198 suppresses a collision threat alarm based on a determination that the first mobile device 198 and the second mobile device 198 will not collide because they are not located at substantially the same altitude.

In some implementations, the barometric pressure system 200 is an element of a vehicle 123. The barometric pressure system 200 may include a plurality of electronic sensor devices configured to record first barometric pressure data describing a first barometric pressure associated with the vehicle 123. Each of the electronic sensor devices records a separate barometric pressure reading associated with the vehicle 123.

The analysis module 208 of the barometric pressure system 200 may include code and routines configured to (1) analyze the separate barometric pressure readings associated with the plurality of electronic sensor devices to determine, for each of the electronic sensor devices, a confidence factor indicating confidence in the accuracy of the barometric pressure reading for each of the electronic sensor devices and (2) determine whether to provide a sensor service recommendation based on the confidence factor. In some implementations, analysis module 208 may include code and routines configured to analyze variation of the separate barometric pressure readings among the plurality of electronic sensor devices to determine the confidence factor.

The barometric pressure system 200 of the vehicle 123 may also include an onboard vehicle computer 182 that is communicatively coupled to the plurality of electronic sensor devices. The onboard vehicle computer 182 may be programmed by the analysis module 208 to (1) analyze the separate barometric pressure readings associated with the plurality of electronic sensor devices to determine, for each of the electronic sensor devices, a confidence factor indicating confidence in the accuracy of the barometric pressure reading for each of the electronic sensor devices and (2) determine whether to provide a sensor service recommendation based on the confidence factor.

In some implementations, the onboard vehicle computer 182 may be programmed by the analysis module 208 to analyze variation of the separate barometric pressure readings among the plurality of electronic sensor devices to determine the confidence factor. In some implementations, the confidence factor may be based in part on one or more of (1) time to live data associated with the plurality of electronic sensor devices and describing an estimate of how long the plurality of electronic sensor devices are estimated to live and (2) time since calibration data associated with the plurality of electronic sensor devices and describing how long since the plurality of electronic sensor devices was calibrated.

In some implementations, the barometric pressure system 200 also includes a network 105 and a mobile device 195. The vehicle 123 and the mobile device 198 may be communicatively coupled to the network 105. The mobile device 198 may include functionality to determine a barometric pressure reading for the mobile device 198. For example, the mobile device 198 may include a second barometric pressure system 200. The vehicle 123 may receive second barometric pressure data describing a second barometric pressure reading associated with the mobile device 198. For example, the communication unit 245 of the vehicle 123 may receive the second barometric pressure data from the network 105.

The onboard vehicle computer 182 may be programmed by the analysis module 208 to (1) analyze the second barometric pressure reading associated with the mobile device and the separate barometric pressure readings associated with the plurality of electronic sensor devices to determine, for each of the electronic sensor devices, the confidence factor indicating confidence in the accuracy of the barometric pressure reading for each of the electronic sensor devices and (2) determine whether to provide the sensor service recommendation based on the confidence factor.

The second mobile device 198 may be communicatively coupled to the network 105. The second mobile device 198 may be configured to receive the first barometric pressure data describing the acceleration-adjusted reading and determine an estimate of altitude separation based on the first barometric pressure data and second barometric pressure data describing a second barometric pressure associated with the second mobile device 198. The estimate of altitude separation may describe an estimate of whether the first mobile device 198 and the second mobile device 198 are located at substantially the same altitude.

In some implementations, the barometric pressure system 200 is an element of a mobile device 198. The analysis module 208 of the barometric system 200 may include code and routines configured to determine the location of the mobile device 198 based on an acceleration-adjusted barometric pressure. The barometric pressure system 200 may include a memory 227 storing altitude map data 282. The altitude map data 282 may describe an altitude map for a geographic area and a plurality of altitudes associated with a plurality of locations included in the geographic area. The barometric pressure system 200 may also include a GPS system configured to determine location data 284 describing an estimate of a location of the mobile device 198. The barometric pressure system 200 may also include a set of first electronic sensor devices configured to record barometric pressure data describing a barometric pressure associated with the mobile device 198. The barometric pressure system 200 may also include a second electronic sensor device configured to record acceleration data describing an acceleration of the mobile device 198.

The analysis module 208 of the barometric pressure system 200 may include code and routines configured to (1) adjust the barometric pressure data based on the acceleration of the mobile device 198 so that the barometric pressure data describes an acceleration-adjusted reading of the barometric pressure associated with the mobile device 198, (2) determine an altitude-based geographic location of the mobile device 198 by analyzing the altitude map to identify a location having an altitude indicated by the barometric pressure data and (3) adjust the location data based on the altitude-based geographic location so that the location data more accurately describes the location of the mobile device 198. In this way, the barometric pressure system 200 may in some implementations be configured to improve the accuracy of a GPS system by increasing the accuracy of the GPS system.

The barometric pressure system 200 may also include a processor 225 communicatively coupled to the memory 227, the GPS system, the set of first electronic sensor devices and the second electronic sensor device. The processor 225 may be programmed by the analysis module 208 to (1) adjust the barometric pressure data based on the acceleration of the mobile device 198 so that the barometric pressure data describes an acceleration-adjusted reading of the barometric pressure associated with the mobile device 198, (2) determine an altitude-based geographic location of the mobile device 198 by analyzing the altitude map to identify a location having an altitude indicated by the barometric pressure data and (3) adjust the location data based on the altitude-based geographic location so that the location data more accurately describes the location of the mobile device 198.

In some implementations, the barometric pressure system 200 is an element of a vehicle 123 and the analysis module 208 includes code and routines configured to automatically generate an altitude map for a lane of a roadway in a geographic area based on an acceleration-adjusted barometric pressure. The barometric pressure system 200 may include a GPS system configured to determine location data 284 describing an estimate of a location of the vehicle 123. The barometric pressure system 200 may also include a roadway imaging device configured to determine which lane the vehicle is located in while at the location. The roadway imaging device may include a LIDAR camera or some other imaging device (e.g., a non-high definition camera, a high definition camera, etc.). The barometric pressure system 200 may also include a set of first electronic sensor devices configured to record barometric pressure data describing a barometric pressure associated with the vehicle 123. The barometric pressure system may also include a second electronic sensor device configured to record acceleration data describing an acceleration of the vehicle 123.

The analysis module 208 may include code and routines configured to (1) adjust the barometric pressure data based on the acceleration of the vehicle 123 so that the barometric pressure data describes an acceleration-adjusted reading of the barometric pressure associated with the vehicle 123, (2) adjust the location data 284 to include one or more bits of data describing the lane the vehicle 123 was located in while at the location, (3) determine an altitude for the lane based on the first barometric pressure data and (4) store altitude map data 282 describing the location data 284 and the altitude for the lane the vehicle 123 was located in while at the location. The altitude map data 282 may be stored by the analysis module 208 in a memory 227 of the barometric pressure system 200.

The analysis module 208 may also include code and routines configured to generate a geographic location vector for the vehicle 123 based on one or more of: (1) the location data 284; (2) a first speed of the vehicle 123; (3) the barometric pressure data describing the acceleration-adjusted reading of the barometric pressure associated with the vehicle 123; (4) the altitude map data 282; (5) a current time; (6) a direction of the vehicle 123 and (7) the an acceleration of the vehicle 123.

The barometric pressure system 123 may also include an onboard vehicle computer 182 communicatively coupled to memory 227, the GPS system, the roadway imaging device, the set of first electronic sensor devices and the second electronic sensor device. The onboard vehicle computer 182 may be programmed by the analysis module 208 to (1) adjust the barometric pressure data based on the acceleration of the vehicle 123 so that the barometric pressure data describes an acceleration-adjusted reading of the barometric pressure associated with the vehicle 123, (2) adjust the location data 284 to include one or more bits of data describing the lane the vehicle 123 was located in while at the location, (3) determine an altitude for the lane based on the first barometric pressure data and (4) store altitude map data 282 describing the location data 284 and the altitude for the lane the vehicle 123 was located in while at the location.

In some implementations, the onboard vehicle computer 182 is further programmed by the analysis module 208 to generate a geographic location vector for the vehicle 123 based on one or more of: (1) the location data 284; (2) a first speed of the vehicle 123; (3) the barometric pressure data describing the acceleration-adjusted reading of the barometric pressure associated with the vehicle 123; (4) the altitude map data 282; (5) a current time; (6) a direction of the vehicle 123 and (7) the an acceleration of the vehicle 123.

In some implementations, the barometric pressure system 200 is an element a vehicle 123 that is autonomous or semi-autonomous. The barometric pressure system 200 may be configured to automatically steer the vehicle 123 based on an acceleration-adjusted barometric pressure determined by the analysis module 208.

The memory 227 of the barometric pressure system 208 may store altitude map data 282. The altitude map data 282 may describe an altitude map for a geographic area and a plurality of altitudes associated with a plurality of lane locations included in the geographic area.

The barometric pressure system 200 may also include a GPS system configured to determine location data 284 describing an estimate of a location of the vehicle 123. The barometric pressure system 200 may also include a roadway imaging device configured to determine which lane the vehicle 123 is located in while at the location and detect an instance where a trajectory of the vehicle 123 will cause the vehicle 123 to leave the lane without authorization if not corrected. For example, the vehicle 123 may be on a path that will cause the vehicle to swerve into an adjacent lane, thereby endangering the safety of one or more drivers on the roadway.

The barometric pressure system 200 may also include a set of first electronic sensor devices configured to record barometric pressure data describing a barometric pressure reading associated with the vehicle 123. The barometric pressure system 200 may also include a second electronic sensor device configured to record acceleration data describing an acceleration of the vehicle 123.

The analysis module 208 of the barometric pressure system 200 may include code and routines configured to (1) adjust the barometric pressure data based on the acceleration of the vehicle 123 so that the barometric pressure data describes an acceleration-adjusted reading of the barometric pressure associated with the vehicle 123, (2) determine an altitude-based geographic location of the vehicle 123 by analyzing the altitude map to identify a location having an altitude indicated by the barometric pressure data, (3) adjust the location data based on the altitude-based geographic location so that the location data 284 more accurately describes the location of the vehicle 123 and which lane the vehicle is located in while at the location, (4) determine a corrective action including which direction to steer the vehicle 123 so that the trajectory of the vehicle 123 will cause the vehicle 123 to remain in the lane and (5) cause the vehicle 123 to be steered based on the corrective action so that the trajectory of the vehicle 123 will cause the vehicle 123 to remain in the lane.

The barometric pressure system 200 may also include an onboard vehicle computer 182 communicatively coupled to the GPS system, the roadway imaging device, the set of first electronic sensor devices and the second electronic sensor device. The onboard vehicle computer 182 may be programmed by the analysis module 208 to (1) adjust the barometric pressure data based on the acceleration of the vehicle 123 so that the barometric pressure data describes an acceleration-adjusted reading of the barometric pressure associated with the vehicle 123, (2) determine an altitude-based geographic location of the vehicle 123 by analyzing the altitude map to identify a location having an altitude indicated by the barometric pressure data, (3) adjust the location data 284 based on the altitude-based geographic location so that the location data 284 more accurately describes the location of the vehicle 123 and which lane the vehicle 123 is located in while at the location, (4) determine a corrective action including which direction to steer the vehicle 123 so that the trajectory of the vehicle 123 will cause the vehicle 123 to remain in the lane and (5) cause the vehicle 123 to be steered based on the corrective action so that the trajectory of the vehicle 123 will cause the vehicle 123 to remain in the lane.

In some implementations, the barometric pressure system 200 includes a network 105 communicatively coupled to a first mobile device 198 and a second mobile device 198 which is located at substantially the same altitude as the first mobile device 198. The barometric pressure system 200 may also include a memory 227.

The first mobile device 198 may include a set of first electronic sensor devices, a second electronic sensor device and a first processor 225. The set of first electronic sensor devices may be configured to record first barometric pressure data describing a first barometric pressure reading associated with the first mobile device 198. The second electronic sensor device may be configured to record acceleration data describing an acceleration of the first mobile device 198.

The analysis module 208 of the barometric pressure system 200 may include code and routines configured to adjust the first barometric pressure data based on the acceleration of the first mobile device 198 so that the first barometric pressure data describes an acceleration-adjusted reading of the first barometric pressure associated with the first mobile device 198.

The first processor 225 may be communicatively coupled to the network 105, the memory 227, the set of first electronic sensor devices and the second electronic sensor device. The first processor 225 may be programmed by the analysis module 208 to adjust the first barometric pressure data based on the acceleration of the first mobile device 198 so that the first barometric pressure data describes an acceleration-adjusted reading of the first barometric pressure associated with the first mobile device 198.

The second mobile device 198 may be communicatively coupled to the network 105. The second mobile device 198 may be configured to transmit second barometric pressure data describing a second barometric pressure associated with the second mobile device 198. The second mobile device 198 may transmit the second barometric pressure data to the network 105.

The first processor 225, which may also be communicatively coupled to the network 105, may receive the second barometric pressure data from the network 105. The analysis module 208 of the barometric pressure system 200 may include code and routines configured to determine a variance between the first barometric pressure and the second barometric pressure. For example, the smaller of the two barometric pressures may be subtracted from the larger of the two barometric pressures to determine the variance. The first processor 225 may be programmed by the analysis module 208 to determine the variance between the first barometric pressure and the second barometric pressure.

The memory 227 may store a plurality of historical variances determined based on a plurality of second barometric pressure data received from a plurality of second mobile devices 198.

The analysis module 208 of the barometric pressure system 200 may include code and routines configured to analyze the variance and the historical variance to determine an adjustment for the acceleration-adjusted reading of the first barometric pressure so that the acceleration-adjusted reading of the first barometric pressure is more accurate.

The first processor 225 of the first mobile device 198 may be programmed by the analysis module 208 to analyze the variance and the historical variance to determine an adjustment for the acceleration-adjusted reading of the first barometric pressure so that the acceleration-adjusted reading of the first barometric pressure is more accurate.

In some implementations, the first mobile device 198 is a first vehicle 123A and the second mobile device is a second vehicle 123B. The second vehicle 123B may be traveling in the same direction as the first vehicle 123 and passing the first vehicle 123A. For example, the first mobile device 123A is heading in a northbound direction in lane one of a freeway. The second mobile device 123B is also heading in the northbound direction in lane two of the same freeway. The second mobile device 123B is traveling at a faster speed than the first mobile device 123A so that the second mobile device 123B is passing the first mobile device 123A. The barometric pressure system 200 may be an element of the first mobile device 123A.

The analysis module 208 may include code and routines configured to (1) determine vehicle motion and air flow noise associated with the second vehicle 123B passing the first vehicle 123A, (2) determine an effect of the vehicle motion and air flow noise on the acceleration-adjusted reading of the first barometric pressure associated with the first vehicle 123A and (3) modify the acceleration-adjusted reading of the first barometric pressure so that the effect is filtered from the acceleration-adjusted reading of the first barometric pressure.

In some implementations, the first processor 225 of the first vehicle 123A is programmed by the analysis module 208 to (1) determine vehicle motion and air flow noise associated with the second vehicle 123B passing the first vehicle 123A, (2) determine an effect of the vehicle motion and air flow noise on the acceleration-adjusted reading of the first barometric pressure associated with the first vehicle 123A and (3) modify the acceleration-adjusted reading of the first barometric pressure so that the effect is filtered from the acceleration-adjusted reading of the first barometric pressure.

In some implementations, the first processor 225 of the first vehicle 123A applies a signal processor to filter the effect from the acceleration-adjusted reading of the first barometric pressure. For example, the first processor 225 applies a Winsorising outlier filtering technique.

In some implementations, the set of first electronic sensor devices and the second electronic sensor device are mounted in the first mobile device 123A in a configuration designed to reduce the effect of the of the vehicle motion and air flow noise on the acceleration-adjusted reading of the first barometric pressure associated with the first mobile device 123A.

In some implementations, the barometric pressure system 200 includes a third mobile device 198. The third mobile device 198 may be communicatively coupled to the network 105. The third mobile device 198 may be configured to transmit third barometric pressure data describing a third barometric pressure associated with the third mobile device 198. The third barometric pressure data may be transmitted to the network 105.

The third mobile device may include a stationary roadside device. For example, the third mobile device is an element of a traffic signal, a pedestrian crosswalk signal, a roadway camera system configured to monitor and determine traffic flow or detect traffic ordinance violations, a special-purpose device configured to provide the functionality of the third mobile device, or any other processor-based computing device mounted along a roadway.

The analysis module 208 may include code and routines configured to determine a variance among two or more of the following: (1) the first barometric pressure associated with the first mobile device 198 or the first vehicle 123A; the second barometric pressure associated with the second mobile device 198 or the second vehicle 123B; and the third barometric pressure associated with the third mobile device 198.

The analysis module may also include code and routines configured to analyze (1) the variance associated with the first barometric pressure, the second barometric pressure and the third barometric pressure and (2) the historical variance to determine an adjustment for the acceleration-adjusted reading of the first barometric pressure so that the acceleration-adjusted reading of the first barometric pressure is more accurate.

The first processor 225 may be programmed by the analysis module 208 to receive the third barometric pressure data from the wireless network and determine a variance among the first barometric pressure, the second barometric pressure and the third barometric pressure. The first processor may be further programmed by the analysis module 208 to analyze (1) the variance associated with the first barometric pressure, the second barometric pressure and the third barometric pressure and (2) the historical variance to determine an adjustment for the acceleration-adjusted reading of the first barometric pressure so that the acceleration-adjusted reading of the first barometric pressure is more accurate.

In some implementations, the barometric pressure system 200 is an element of a vehicle 123 configured to determine three dimensional location data describing the three dimensional location of the vehicle 123. The three dimensional location data may be stored on the memory 227. The memory 227 may also store altitude map data 282. The altitude map data 282 may describe an altitude map for a geographic area and a plurality of known barometric pressures associated with a plurality of locations included in the geographic area. The barometric pressure system 200 may include a GPS system configured to determine location data 284 describing an estimate of a location of the vehicle 123. The barometric pressure system 200 may include a roadway imaging device configured to determine one or more items of interest surrounding the vehicle 123. The barometric pressure system 200 may include a set of first electronic sensor devices configured to record barometric pressure data describing a barometric pressure reading associated with the vehicle 123. The barometric pressure system 200 may include a second electronic sensor device configured to record acceleration data describing an acceleration of the vehicle 123.

The analysis module 208 of the barometric pressure system 200 may include code and routines configured to (1) adjust the barometric pressure data based on the acceleration of the vehicle 123 so that the barometric pressure data describes an acceleration-adjusted reading of the barometric pressure associated with the vehicle 123 and (2) determine the three dimensional location data describing the three dimensional location of a vehicle 123 based on the (a) one or more items of interest surrounding the vehicle 123 matching one or more known items of interest associated with the estimate of the location of the vehicle 123 and (b) the acceleration-adjusted reading of the barometric pressure associated with the vehicle 123 matching a known barometric pressure and a location associated with the matching known barometric pressure included in the altitude map.

The barometric pressure system 200 may include an onboard vehicle computer 182 communicatively coupled to the GPS system, the roadway imaging device, the set of first electronic sensor devices and the second electronic sensor device. The onboard vehicle computer 182 may be programmed by the analysis module 208 to (1) adjust the barometric pressure data based on the acceleration of the vehicle 123 so that the barometric pressure data describes an acceleration-adjusted reading of the barometric pressure associated with the vehicle 123 and (2) determine the three dimensional location data describing the three dimensional location of a vehicle 123 based on the (a) one or more items of interest surrounding the vehicle 123 matching one or more known items of interest associated with the estimate of the location of the vehicle 123 and (b) the acceleration-adjusted reading of the barometric pressure associated with the vehicle 123 matching a known barometric pressure and a location associated with the matching known barometric pressure included in the altitude map.

In some implementations, the barometric pressure system 200 is an element of a vehicle 123. The barometric pressure system 200 may include a network 105 communicatively coupled to the vehicle 123 and a mobile device 198. The vehicle 123 may include a first set of electronic sensor devices, a second electronic sensor device and an onboard vehicle computer 182. The set of first electronic sensor devices may be configured to record first barometric pressure data describing a first barometric pressure reading associated with the vehicle 123. The second electronic sensor device configured to record acceleration data describing an acceleration of the vehicle 123.

The vehicle 123 and the mobile device 198 may be communicatively coupled to the network 105. The mobile device 198 may transmit second barometric pressure data describing a second barometric pressure reading associated with the mobile device 198. The mobile device 198 may transmit second barometric pressure data to the network 105.

The analysis module 208 may determine an estimate of the altitude separation data based on the lateral differential data and data describe the known interval of increase or decrease in altitude for each unit of lateral distance. For example, the altitude may be known to increase or decrease at an estimated interval for each unit of lateral distance in a particular geographic area. Interval data describing the known interval of increase or decrease in altitude for each unit of lateral distance may be stored in the memory 227 or retrieved from the network. The interval data may be an element of the altitude map data 282.

The analysis module 208 may include code and routines configured to: (1) adjust the first barometric pressure data based on the acceleration of the vehicle 123 so that the first barometric pressure data describes an acceleration-adjusted reading of the first barometric pressure associated with the vehicle 123, (2) determine a variance between the second barometric pressure reading and the acceleration-adjusted reading of the first barometric pressure associated with the vehicle 123, (3) determine lateral differential data describing a lateral distance from the vehicle 123 and the mobile device 198 based on the variance and (4) determine an estimate of altitude separation between the vehicle 123 and the mobile device 198 based on the lateral differential data and interval data describing the known interval of increase or decrease in altitude for each unit of lateral distance.

The onboard vehicle computer 182 of the vehicle 123 may be communicatively coupled to the network 105, the set of first electronic sensor devices and the second electronic sensor device. The onboard vehicle computer 182 is programmed by the analysis module 208 to (1) adjust the first barometric pressure data based on the acceleration of the vehicle 123 so that the first barometric pressure data describes an acceleration-adjusted reading of the first barometric pressure associated with the vehicle 123, (2) determine a variance between the second barometric pressure reading and the acceleration-adjusted reading of the first barometric pressure associated with the vehicle 123, (3) determine lateral differential data describing a lateral distance from the vehicle 123 and the mobile device 198 based on the variance and (4) determine an estimate of altitude separation between the vehicle 123 and the mobile device 198 based on the lateral differential data and interval data describing the known interval of increase or decrease in altitude for each unit of lateral distance.

In some implementations, the barometric pressure system 200 is an element of the vehicle 123. The barometric pressure system 200 may include one or more third electronic sensor devices. The one or more third electronic devices may be configured to measure and record temperature and humidity associated with the vehicle 123. For example, the one or more third electronic devices may measure and store environment data 280 describing the temperature and the humidity of the outside environment proximate to the vehicle 123. In these implementations, the onboard vehicle computer 182 may be further programmed by the analysis module 208 to adjust the first barometric pressure data based on the acceleration, the temperature and the humidity associated with the vehicle 123.

In some implementations, the analysis module 208 includes codes and routines configured to determine whether the alarm system 250 will trigger a collision threat alarm based at least in part on the lateral differential data and the estimate of altitude separation between the vehicle 123 and the mobile device 198.

In some implementations, the sensor set 252 may include one or more MEMS sensors configured to measure barometric pressure. The barometric pressure data may be determined based on MEMS sensor deflection and the temperature of the MEMS sensor. Deflection nonlinearity may indicate inaccuracy in the readings of the MEMS sensor. The nonlinearity may be corrected by the calibration module 210 using calibration data determined by the analysis module 208 based on a calibrated pressure source (e.g., a barometric pressure reading received from another object) and a temperature reading taken from the onboard temperature sensor of the vehicle 123 or mobile device 198. The MEMS sensor may include a non-transitory, non-volatile memory such as memory 227. The calibration data may be stored in the memory of the MEMS sensor and used to calibration the barometric pressure data recorded by the MEMS sensor.

In some implementations, the analysis module 208 may determine the differential barometric pressure for two objects based at least in part on a temperature of a column of air between the objects and in part by the temperature of the MEMS sensor. For example, temperature of the MEMS sensor may affect the barometric pressure measurement provided by the MEMS sensor. The value of the barometric pressure measurement provided by the MEMS sensor may vary based on temperature measured on the MEMS sensor. Similarly, the estimated separation distance between the objects based on the column of air may also vary based on the measured temperature of the column of air.

In some implementations, the barometric pressure system 200 is configured to provide data describing an estimate of the elevation of the object which includes the barometric pressure system 200 to within plus or minus 3 meters of the actual elevation of the object.

In some implementations, the barometric pressure system 200 may be implemented using hardware including a field-programmable gate array ("FPGA") or an application-specific integrated circuit ("ASIC"). In some other implementations, the barometric pressure system 200 may be implemented using a combination of hardware and software. The barometric pressure system 200 may be stored in a combination of the devices and servers, or in one of the devices or servers.

Example Environment Data 280 and Motion Data 290

Figure 2B:
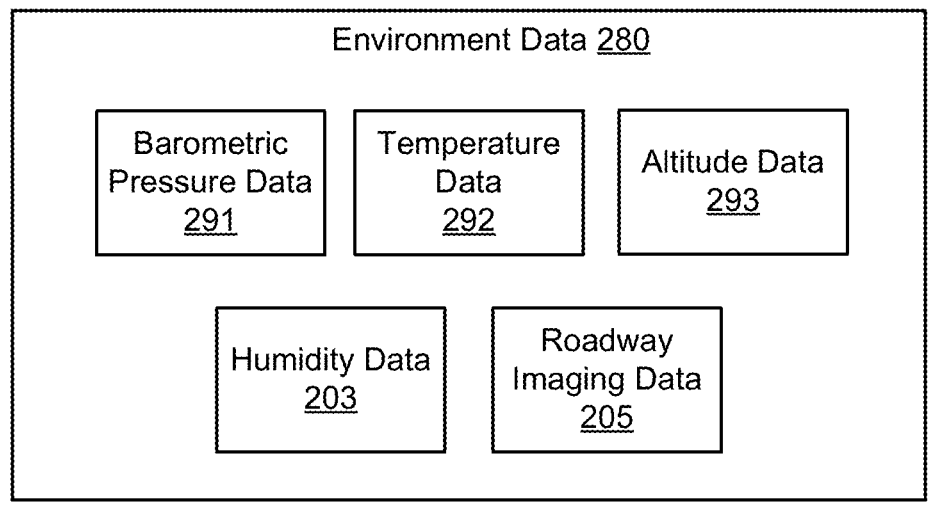
FIG. 2B is a block diagram illustrating an example of environment data.

FIG. 2B is a block diagram illustrating an example of the environment data 280. The environment data 280 may include one or more of the following: barometric pressure data 291; temperature data 292; altitude data 293; humidity data 203; and roadway imaging data 205.

The barometric pressure data 291 may describe one or more measurements of the barometric pressure proximate to the device which includes the barometric pressure system 200. "Proximate to the device" may include the column of air above the device. The barometric pressure reading described by the barometric pressure data 291 may be measured and recorded, for example, by one or more barometric pressure sensors included in the sensor set 252. The barometric pressure data 291 may be adjusted based on the forces affecting the device which includes the barometric pressure system 200. For example, the barometric pressure data 291 may be adjusted based on one or more of the following: acceleration; temperature; humidity; roadway noise; or the forces described by the motion data 290. In some implementations, the barometric pressure data 291 may describe the differential barometric pressure determined by the analysis module 208 and used to determine the estimate of altitude separation.

The temperature data 292 may describe one or more measurements of the temperature proximate to the device which includes the barometric pressure system 200. The temperature reading described by the temperature data 292 may be measured and recorded, for example, by one or more temperature sensors included in the sensor set 252. The temperature sensor may include an onboard temperature sensor of a vehicle 123.

The altitude data 293 may describe one or more altitudes received in a DSRC communication or included in data from a GPS signal. The altitude data 293 is described in more detail below with reference to FIG. 11. For example, a DSRC full position vector may include data describing the elevation or the altitude of an object which transmits the DSRC full position vector.

The humidity data 203 may describe one or more measurements of the humidity proximate to the device which includes the barometric pressure system 200. The humidity reading described by the humidity data 203 may be measured and recorded, for example, by one or more humidistats, humidity sensors or moisture sensors included in the sensor set 252.

The roadway imaging data 205 may describe one or more images of the roadway proximate to the device which includes the barometric pressure system 200. The roadway images described by the roadway imaging data 205 may be captured, for example, by one or more cameras or range imaging systems included in the sensor set 252.

The environment data 280 may include other data. For example, the environment data 280 may include data describing any physical attribute of the environment proximate to the device which includes the barometric pressure system 200.

Figure 2C:
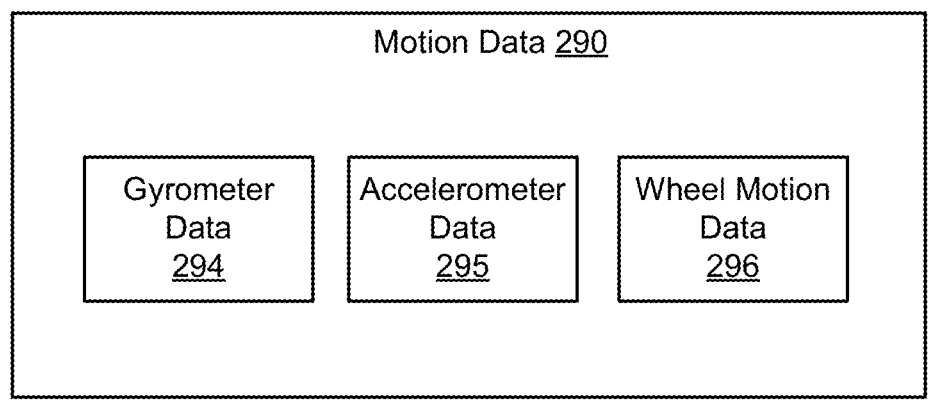
FIG. 2C is a block diagram illustrating an example of motion data.

FIG. 2C is a block diagram illustrating an example of the motion data 290. The motion data 290 may include one or more of the following: gyrometer data 294; accelerometer data 295; and wheel motion data 296.

The gyrometer data 294 may describe one or more measurements of the orientation of the device which includes the barometric pressure system 200. The gyrometer data 294 may describe any measurements of the one or more gyrometers. The orientation reading described by the gyrometer data 294 may be measured and recorded, for example, by one or more gyrometers included in the sensor set 252. The gyrometer data 294 may describe any measurements of the one or more gyrometers.

The accelerometer data 295 may describe one or more recordings of the acceleration of the device which includes the barometric pressure system 200. The acceleration reading described by the accelerometer data 295 may be measured and recorded, for example, by one or more accelerometers included in the sensor set 252.

In some implementations, the barometric pressure system 200 is an element of a mobile device 198. For example, the barometric pressure system 200 is an element of a smartphone. A driver of a vehicle 123 may be traveling with the smartphone. The accelerometer data 295 may describe the acceleration of the vehicle 123.

The wheel motion data 296 may describe the motion of a steering wheel of a vehicle 123 which includes the barometric pressure system 200.

The motion data 290 may include other data. For example, the motion data 290 may include data describing any dynamic motion of a device which includes the barometric pressure system 200 or a device which is proximate to the device which includes the barometric pressure system 200.

Altitude Separation

Figure 3:
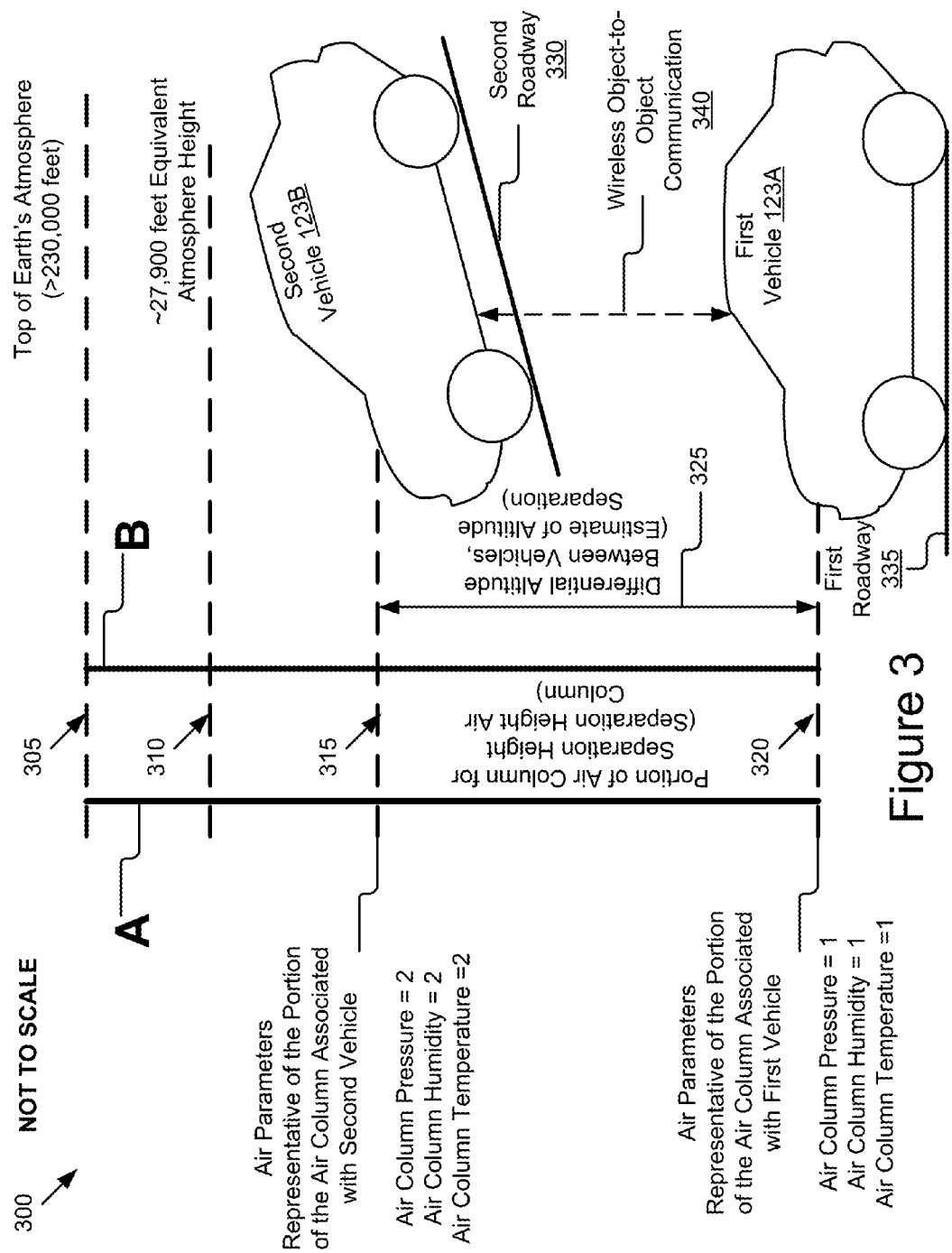
FIG. 3 is a block diagram illustrating an example altitude separation between a first vehicle and a second vehicle.

FIG. 3 is a block diagram illustrating an operating environment 300 including an example altitude separation between a first vehicle 123A and a second vehicle 123B according to some implementations. The top of the Earth's atmosphere may be indicated by element 305. For the purposes of explanation, assume that the top of the Earth's atmosphere is 230,000 feet above sea level. Lines "A" and "B" may indicate boundaries forming a column of air starting at the surface of the Earth and extending to the top of the Earth's atmosphere. The column of air formed by lines "A" and "B" will be referred to herein as "the column of air."

A first roadway may be indicated by element 335. The first roadway 335 may be located on the surface of the Earth. A first vehicle 123A may be traveling on the first roadway. A second roadway may be indicated by element 330. The second roadway is located at an altitude that is higher than the first roadway. A second vehicle 123B is traveling on the second roadway. The estimate of altitude separation between the first vehicle 123A and the second vehicle 123B is indicated by element 325.

Element 310 may indicate an altitude of approximately 27,900 feet above the surface of the Earth.

Element 320 may indicate a portion of the column of air that corresponds to air parameters associated with the first vehicle 123A. The air parameters for the first vehicle 123A and element 320 may include the pressure (i.e., barometric pressure), humidity and temperature associated with the column of air which corresponds to the first vehicle 123A.

Element 315 may indicate a portion of the column of air that corresponds to air parameters associated with the second vehicle 123B. The air parameters for the second vehicle 123B and element 315 may include the pressure (i.e., barometric pressure), humidity and temperature associated with the column of air which corresponds to the second vehicle 123B.

Element 340 is a signal line indicating that the first vehicle 123A and the second vehicle 123A each include wireless antenna hardware (e.g., communication unit 245) configured to enable wireless object-to-object communication with one another. For example, the element 340 may indicate that the first vehicle 123A and the second vehicle 123B may communicate with one another via one or more of the following: DSRC; Wi-Fi; Bluetooth™; etc.

The first vehicle 123A may include a first barometric pressure system 200 and the second vehicle 123B may include a second barometric pressure system 200. The first barometric system 200 of the first vehicle 123A may measure and record the air parameters associated with the first vehicle 123A and element 320. The second barometric system 200 of the second vehicle 123B may measure and record the air parameters associated with the second vehicle 123B and element 315. The vehicles 123A, 123B may wirelessly communicate their air parameters to one another via the signal line 340.

Example deficiencies of the prior art barometric pressure systems will now be described. Element 335 indicates a first roadway. Assume that the first roadway 335 is located at zero feet above sea level and that the column of air is located above a point on the first roadway 335 that is in the proximity of the first vehicle 123A.

Prior art barometric pressure systems always rely on absolute barometric pressure that is adjusted for humidity and temperature. Any measurement of absolute barometric pressure that is adjusted for humidity is a humidity-adjusted absolute barometric pressure measurement. Any measurement of absolute barometric pressure that is adjusted for temperature is a temperature-adjusted absolute barometric pressure measurement. Any measurement that is adjusted for humidity and temperature is a humidity and temperature-adjusted absolute barometric pressure measurement. By contrast, in some implementations the barometric pressure system 199, 200 may include a standard air column temperature and humidity for generating the transmitted barometric pressure. In some implementations, the barometric pressure system 199, 200 further contrasts with prior art barometric pressure systems by using a MEMs sensor temperature measurement for adjusting a calibration of a MEMs barometric pressure measurement.

Prior art barometric pressure systems generally provide a humidity and temperature-adjusted absolute barometric pressure measurement. For example, the absolute barometric pressure above the point in the first roadway 335 is a function of the weight of the column of air from zero feet above sea level (as indicated by element 335) to 230,000 feet above sea level (e.g., as indicated by element 305). Prior art barometric pressure systems work in the following way: (1) a barometric pressure sensor may measure absolute barometric pressure at the point on the first roadway 335; (2) a temperature sensor measures the temperature of the column of air; (3) a humidity sensor measures the humidity of the column of air; (4) the prior art barometric pressure system then adjust the reading of absolute barometric pressure based on (a) the temperature of the column of air and (b) the humidity of the column of air; and (5) the prior art barometric pressure system outputs a humidity and temperature-adjusted absolute barometric pressure measurement. Prior art barometric pressure systems never rely on the relative barometric pressure measurements between two objects or two points.

A typical humidity and temperature-adjusted absolute barometric pressure measurement at sea level (as indicated by element 335) is about 1 bar or 1,000 millibar. Absolute barometric pressure is generally inversely proportional to altitude. In other words, absolute barometric pressure generally decreases with an increase in altitude. Assuming a temperature of 60 degrees Fahrenheit, an increase in altitude of 27.4 feet generally corresponds to a decrease in absolute barometric pressure by 1 millibar. For example, assuming a temperature of 60 degrees Fahrenheit, absolute barometric pressure may be 1,000 millibars at sea level (as indicated by element 335) and then decrease to 999 millibars as the altitude increases to 27.4 feet above sea level and the temperature remains substantially constant.

Absolute and relative measurements of barometric pressure may be used to estimate the altitude of objects. For example, if a barometric pressure sensor indicates an absolute barometric pressure measurement of 999 millibars and the temperature is 60 degrees Fahrenheit, then the estimated altitude of the sensor is substantially 27.4 feet above sea level. An absolute barometric pressure measurement of 998 millibars at a temperature of 60 degrees Fahrenheit corresponds to an estimated altitude of 54.8 feet above sea level. Accordingly, a change in the reading of absolute barometric pressure indicates a significant change in altitude when applied to a paradigm where the barometric pressure measurements are used for determining the altitude of objects located on the ground such as vehicles and mobile devices.

For example, referring to FIG. 3, element 335 is a first roadway and element 330 is a second roadway. The second roadway 330 is an overpass which is above the first roadway 335. A typical overpass is elevated about 35 feet above other roadways. For example, the second roadway 330 is 35 feet above the first roadway 335. A consequence of this is that prior art barometric pressure measurements may not be used to determine whether a first vehicle 123A traveling on the first roadway 335 is at the same altitude as a second vehicle 123B traveling on the second roadway 330.

For example, assume that the operating environment 300 is located in Denver, Colo. The highest point in Denver is 5,690 feet above sea level. In this example, the first roadway 335 is 5,690 feet above sea level. Humidity and temperature sensors are inaccurate, particularly so when measuring humidity across a column of air as in FIG. 3. The accuracy of a humidity sensor measuring humidity across a column of air as in FIG. 3 is generally plus or minus 10% and the accuracy of a temperature sensor measuring temperature across a column of air is generally plus or minus 1%. Experimentation has shown that determining altitude using absolute barometric pressure measurements that are adjusted for humidity results in a plus or minus 1% miscalculation of altitude. In other words, using a prior art barometric pressure system, the altitude of the first roadway 335 may be determined to be anywhere from 5,746.9 feet (1% greater than 5,690 feet) to 5,633.1 feet (1% less than 5,690 feet).

Assume that the first vehicle 123A and the second vehicle 123B are both traveling on the first roadway 330. Using prior art barometric pressure systems, the first vehicle 123A may be determined to be traveling at an altitude of 5,633.1 feet and the second vehicle 123B may be determined to be traveling at an altitude of 5,746.9 feet. If the first vehicle 123A includes an alarm system 250 and a prior art barometric pressure system, then the onboard vehicle computer 182 of the first vehicle 123A may erroneously determine that the first vehicle 123A and the second vehicle 123B are located at different altitudes, and so, it is safe to suppress a collision threat alarm incident. The consequence of this error may be that the first vehicle 123A and the second vehicle 123B collide and humans are killed. Because of this, prior art barometric pressure systems are not compatible with safety systems that determine the altitude of objects such as vehicles and mobile devices.

By contrast, the barometric pressure system 199, 200 of FIGS. 1 and 2A always rely on relative barometric pressure measurements, which has been proven by experimentation to be sufficiently accurate for safety systems that determine the altitude of objects such as vehicles and mobile devices. For example, the barometric pressure system 199, 200 always determines a differential barometric pressure for two objects. The barometric pressure system 199, 200 may then determine an altitude separation for the two objects based at least in part on the differential barometric pressure value.

Figure 4:
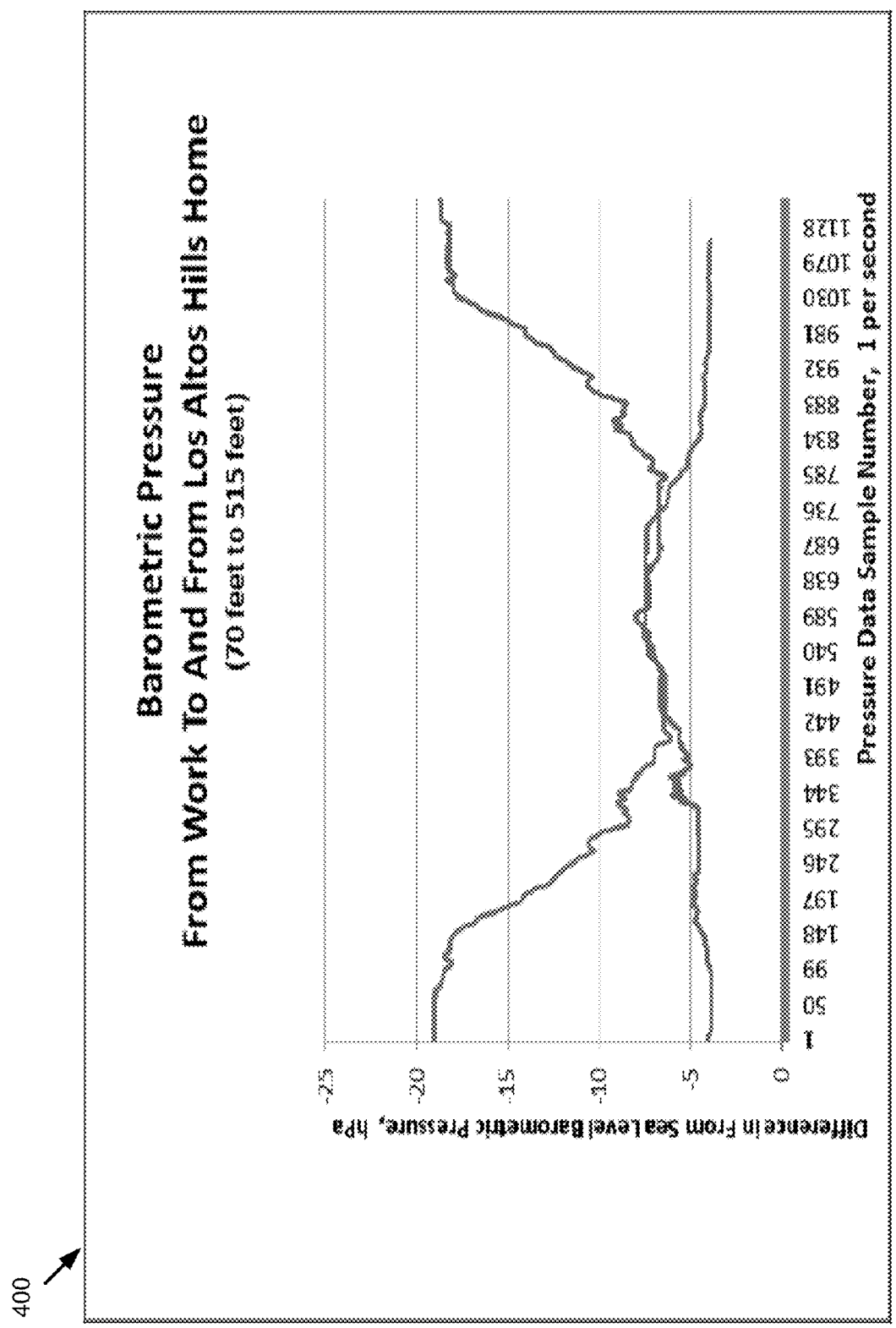
FIG. 4 is a chart depicting barometric pressure variation during an example first journey.

FIG. 4 is a chart 400 depicting barometric pressure variation during an example first journey according to some implementations. In this example, "work" is a location in Mountain View, Calif. and that home is a location in Los Altos Hills, Calif.

Figure 5:
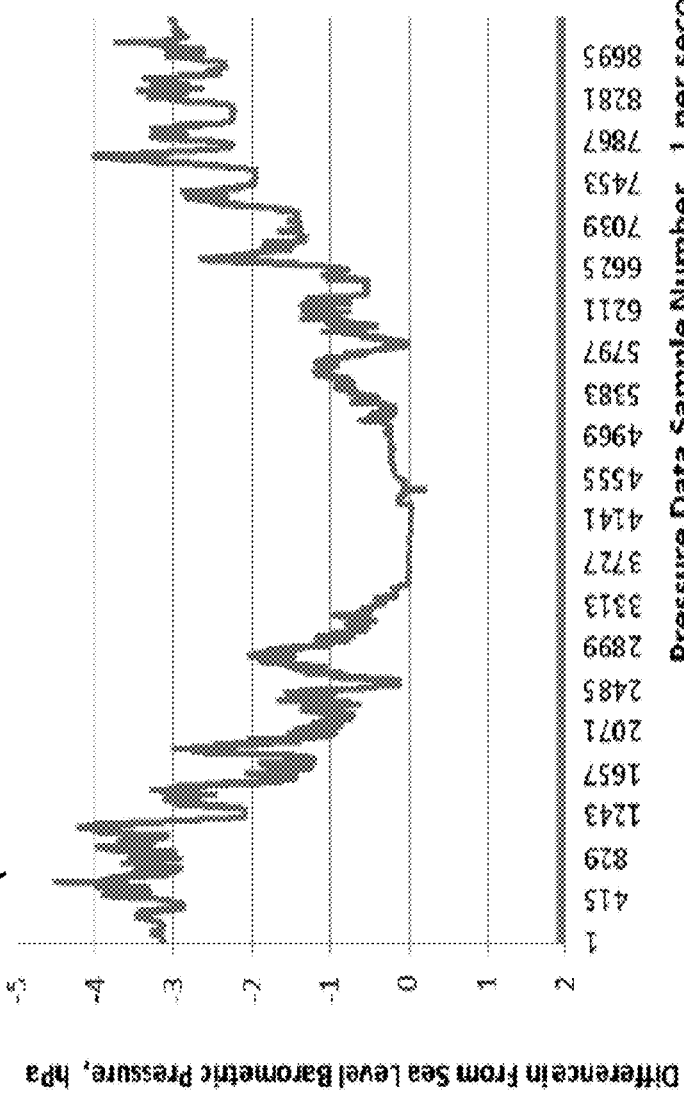
FIG. 5 is a chart depicting barometric pressure variation during an example second journey.

FIG. 5 is a chart 500 depicting barometric pressure variation during an example second journey according to some implementations. In this example, "work" is a location in Mountain View, Calif. that is 86 feet above sea level and the Shoreline Kayak Ramp is a location in Mountain View, Calif. that is 0 feet above sea level. The second journey goes from work to the Shoreline Kayak Ramp and then back to work. The portion of the journey located at the Shoreline Kayak Ramp corresponds to the pressure data of the X and Y axis converging on zero.

Figure 6:
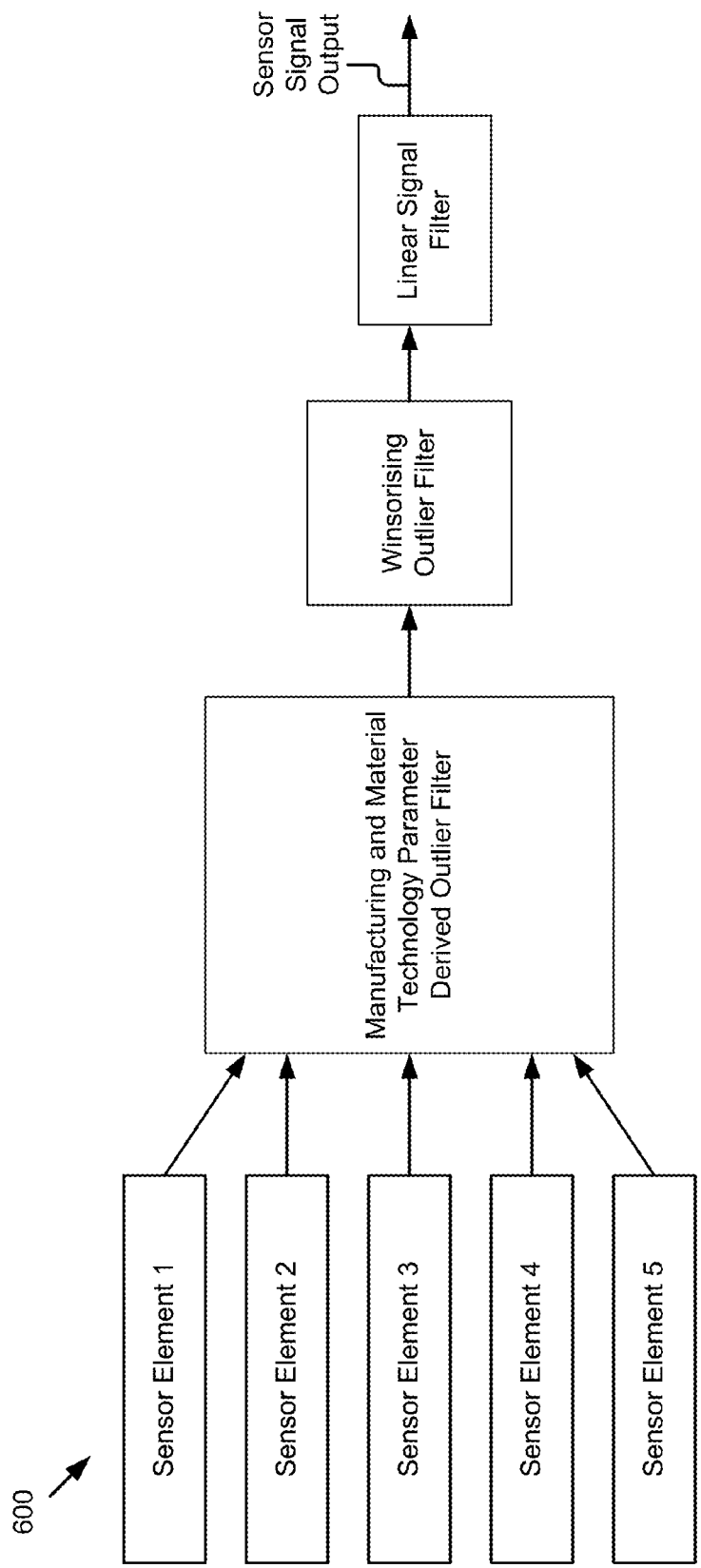
FIG. 6 is a block diagram illustrating a process flow for determining a sensor signal output.

FIG. 6 is a block diagram illustrating an example process flow 600 for determining a sensor signal output according to some implementations. A plurality of sensors provides an input to a manufacturing and material technology parameter derived outlier filter. The signal may include sensor data. The manufacturing and material technology parameter derived outlier filter processes the signal and outputs a signal to a Winsorising outlier filter. The Winsorising outlier filter processes the signal and outputs a signal to a linear signal filter. The linear signal filter processes the signal and outputs a sensor signal output. The processor flow 600 may be an example of signal processing implemented by the processor 225. The processor 225 may be programmed to implement the process flow 600 by the analysis module 208.

Figure 7:
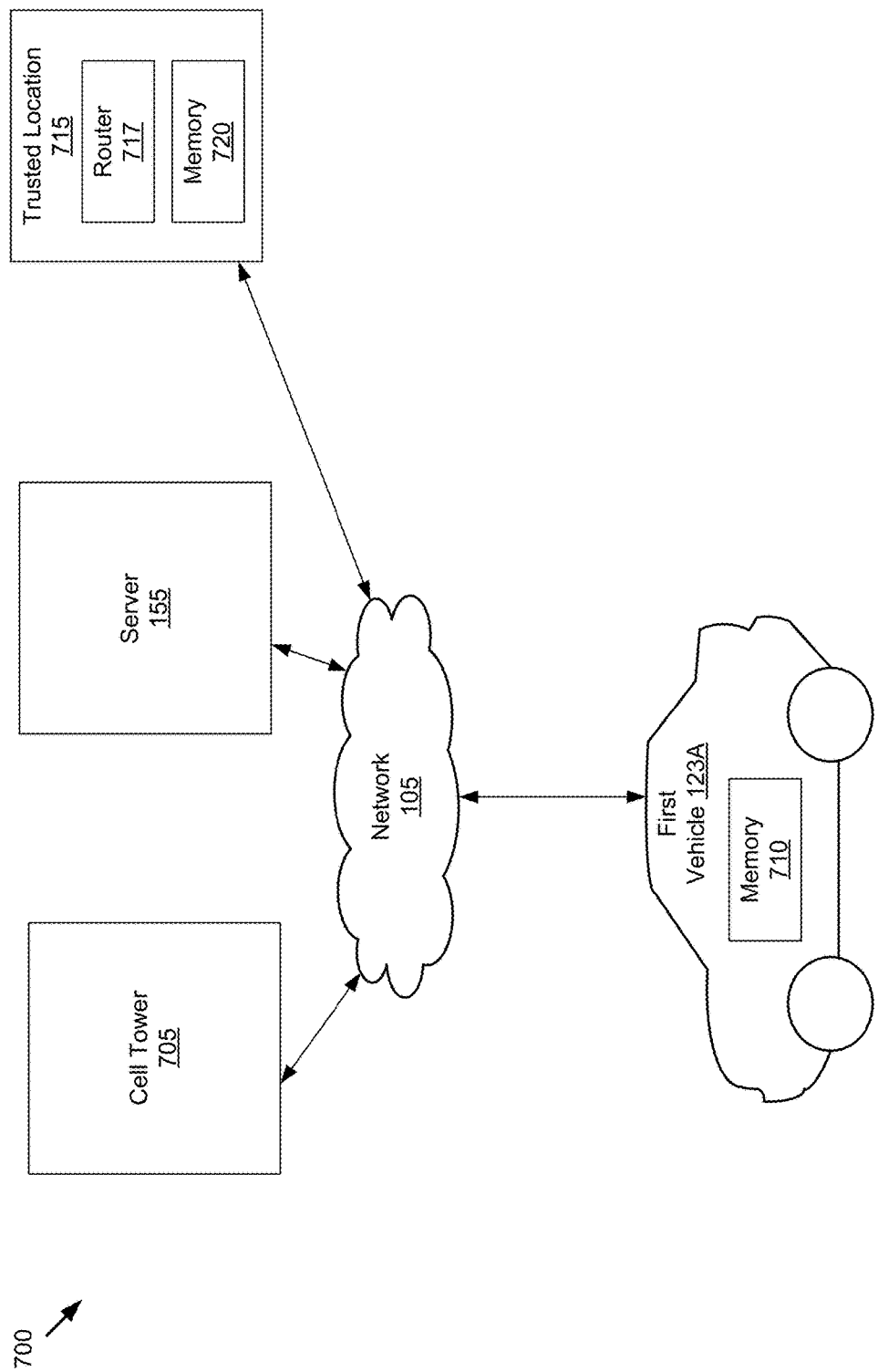
FIG. 7 is a block diagram of a system for generating altitude map data describing an altitude map for a geographic area.

FIG. 7 is a block diagram of a system 700 for generating altitude map data 282 describing an altitude map for a geographic area. The first vehicle 123A may include a barometric pressure system 200. The first vehicle 123A may be traveling in a geographic area. As the first vehicle 123A travels, it may record data describing one or more of the following: its present location; the present time; and the barometric pressure recorded at the location and time. This data may be stored in a memory 710 as altitude map data 282. The memory 710 may include a non-transitory storage medium such as memory 227 described above with reference to FIG. 2A. The altitude map data 282 may be transmitted to the network 105. As the first vehicle 123A is on a journey, a cell tower 705 may receive the altitude map data 282 and transmit it to a server such as server 155. If the first vehicle parks at a trusted location 715 such as a home or work place, then the altitude map data 282 may be wirelessly transmitted to a memory 720 of the trusted location 715. The memory may be a non-transitory memory of a wireless router 717. The wireless router 717 may then transmit the altitude map data 282 to a server such as server 155 via the network 105.

Figure 8:
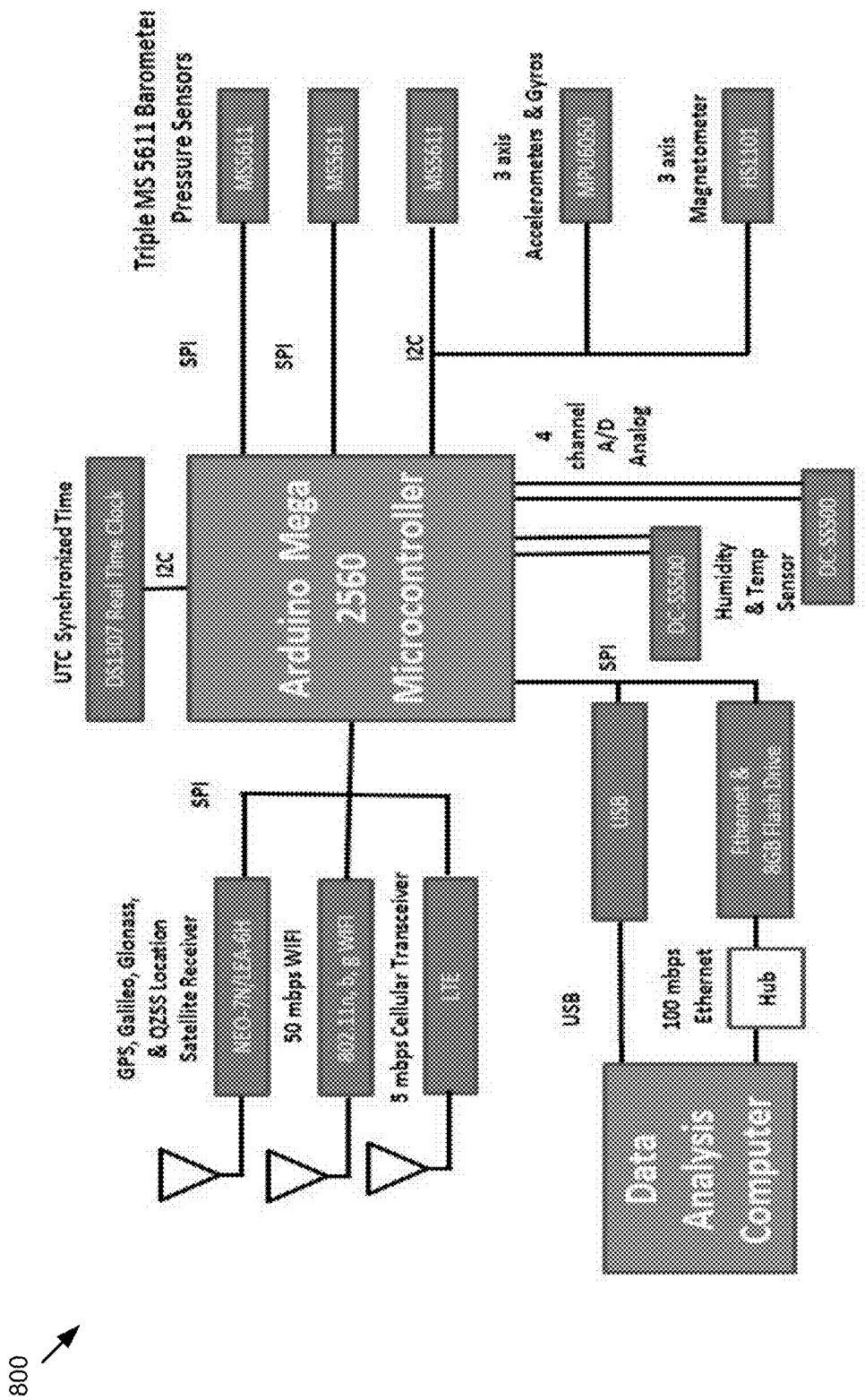
FIG. 8 is a block diagram of an example barometric pressure system.

FIG. 8 is a block diagram of an example barometric pressure system 800 according to some implementations.

FIG. 9 is a chart 900 depicting a specification of an example barometric pressure sensor included in the sensor set 252 of the barometric pressure system 200 according to some implementations.

FIGS. 10A and 10B are charts depicting example data that may be stored in a memory.

Figure 11:
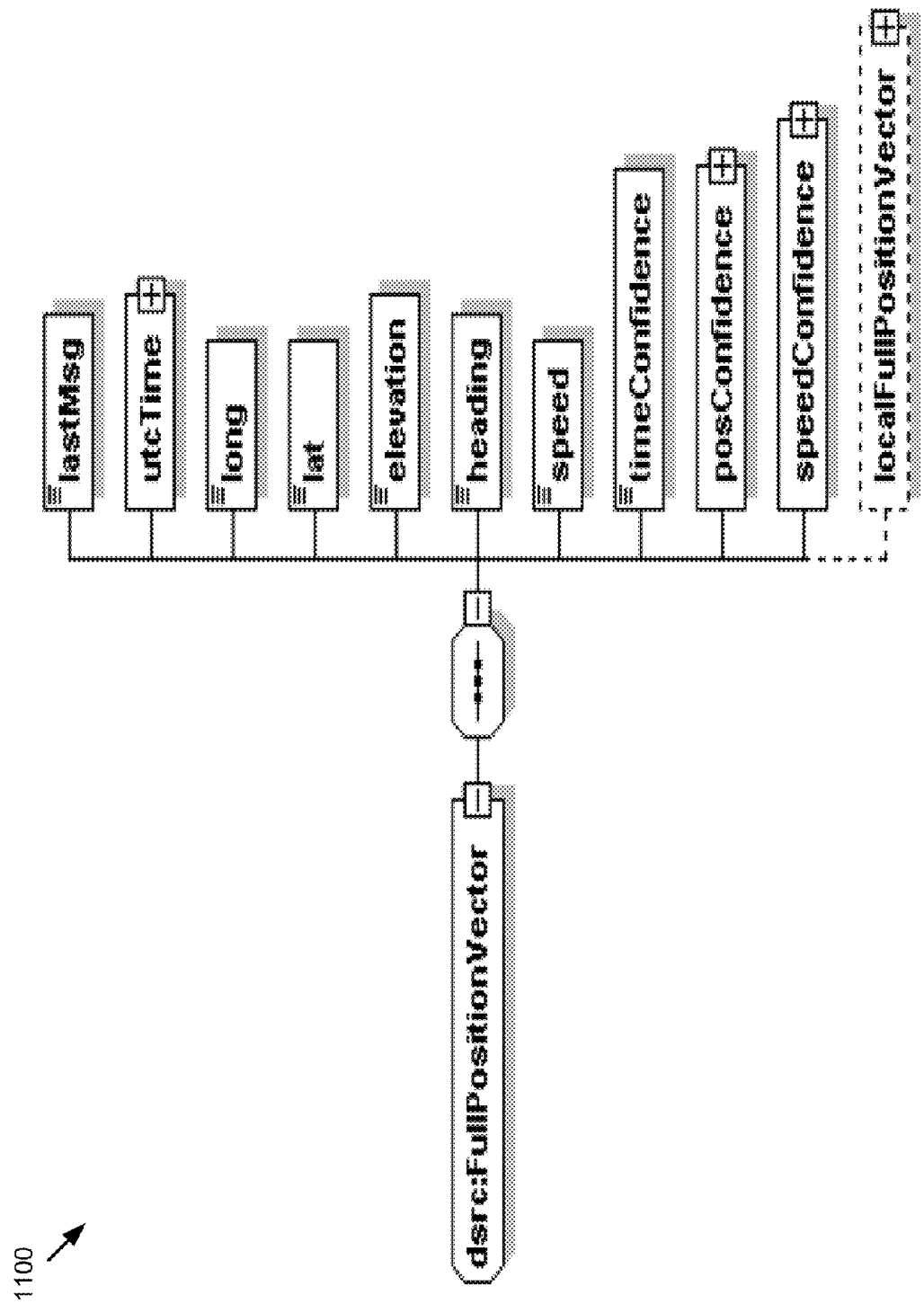
FIG. 11 is a block diagram illustrating an example dedicated short range communication (DSRC) full position vector.

FIG. 11 is a block diagram illustrating an example DSRC full position vector 1100 according to some implementations. The DSRC full position vector 1100 includes data describing, among other things, time, latitude and longitude (e.g., location data 284), altitude (e.g., barometric pressure data 291 or altitude data 293), speed and confidence factors (e.g., quality data 297 related to sensors that measured the time, latitude and longitude, altitude (or elevation) and speed).

In some implementations, the DSRC full position vector 1100 may be an example of object data 286 transmitted from one object to another object. An example of this is described in more detail below with reference to FIGS. 14 and 15.

Figure 12:
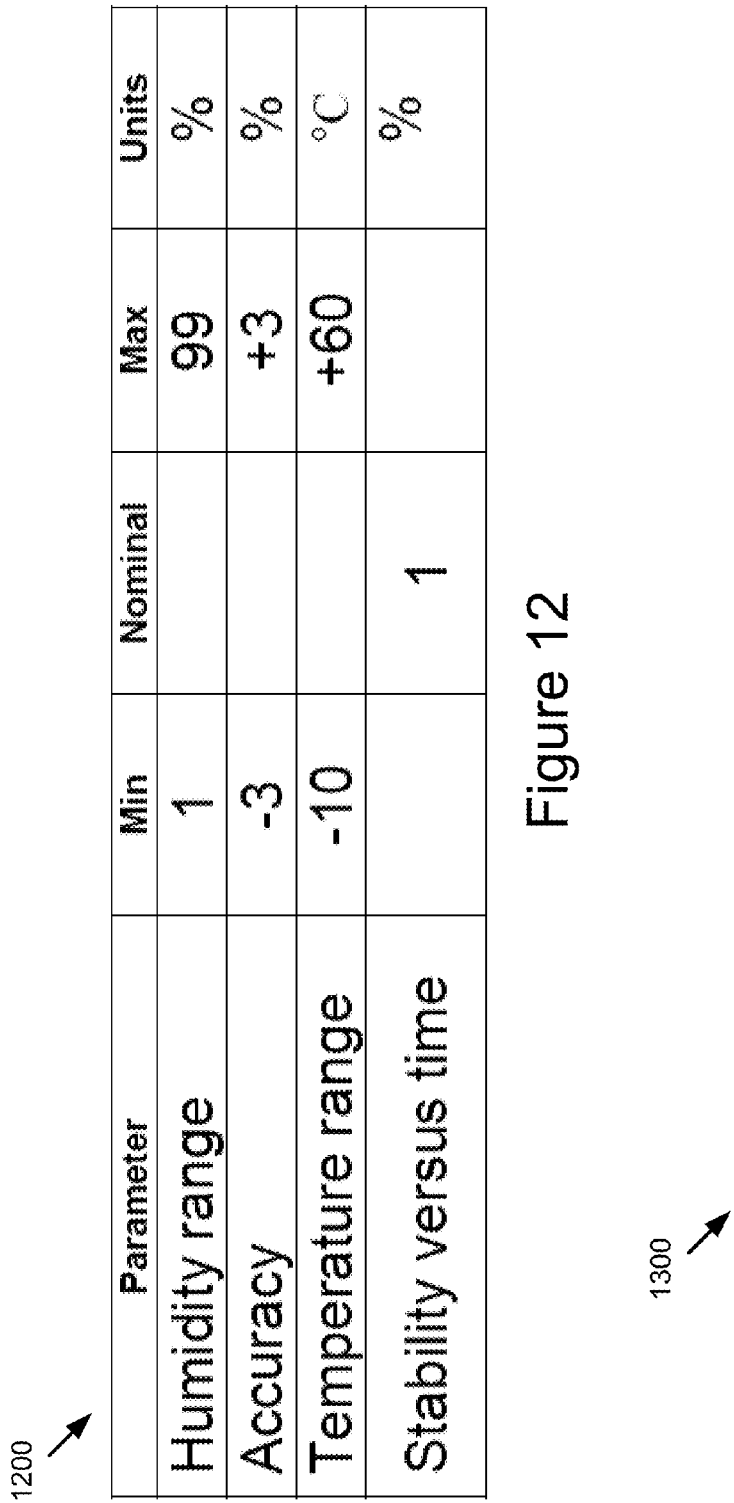
FIG. 12 is a chart depicting a specification of an example capacitive humidity sensor included in the sensor set of the barometric pressure system.

FIG. 12 is a chart 1200 depicting a specification of an example capacitive humidity sensor included in the sensor set 252 of the barometric pressure system 200.

Figure 13:
FIG. 13 is a chart depicting a specification of an example thermistor temperature sensor included in the sensor set of the barometric pressure system.

FIG. 13 is a chart 1300 depicting a specification of an example thermistor temperature sensor included in the sensor set 252 of the barometric pressure system 200.

Figure 14:
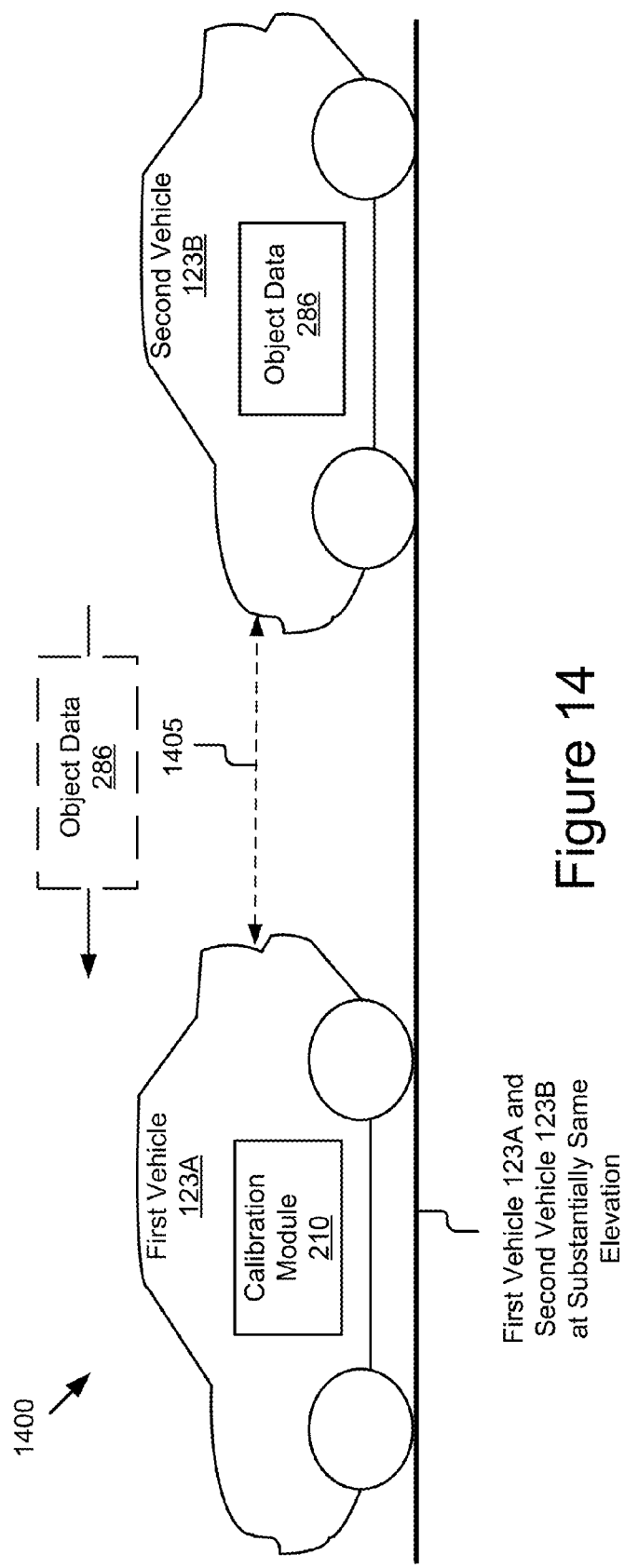
FIG. 14 is a block diagram of an operating environment including a first vehicle and a second vehicle wirelessly communicating with one another via DSRC.

FIG. 14 is a block diagram of an operating environment 1400 including a first vehicle 123A and a second vehicle 123B wirelessly communicating with one another via DSRC. The second vehicle 286 includes object data 286. The object data 286 may describe a barometric pressure measurement recorded by a second barometric pressure system 200 (not pictured) that is an element of the second vehicle 123B.

The second vehicle 123B is communicatively coupled to the first vehicle 123A. A signal line 1405 indicates a wireless communicative coupling between the second vehicle 123B and the first vehicle 123A. The signal line 1405 may indicate a DSRC communication among the second vehicle 123B and the first vehicle 123A.

The second vehicle 123B may provide the object data 286 to the first vehicle 123A via the wireless communication indicated by the signal line 1405. The object data 286 depicted with a dashed line and located above element 1405 indicates the object data 286 is being provided to the first vehicle 123A.

The first vehicle 123A may include a first barometric pressure system 200 (not pictured). The first barometric pressure system 200 may include a calibration module 210. The first vehicle 123A and the second vehicle 123B may be located at substantially the same altitude.

The first vehicle 123A may use the object data 286 to determine if the sensor set 252 (not pictured) of the first vehicle 123A is to be calibrated. For example, the object data 286 may include the barometric pressure data 291 of the second vehicle 123B. The object data 286 may include quality data 297 indicating the quality of the barometric pressure data 291 of the second vehicle 123B. The analysis module 208 (not pictured) of the first vehicle 123A may compare the barometric pressure data 291 of the second vehicle 123B to barometric pressure data of the first vehicle 123A. The analysis module 208 of the first vehicle 123A may determine, based at least in part on the object data 286, that one or more electronic sensors of the sensor set 252 (not pictured) included in the first vehicle 123A is to be calibrated.

Optionally, one or more of the first vehicle 123A and the second vehicle 123B may be a mobile device 198.

Figure 15:
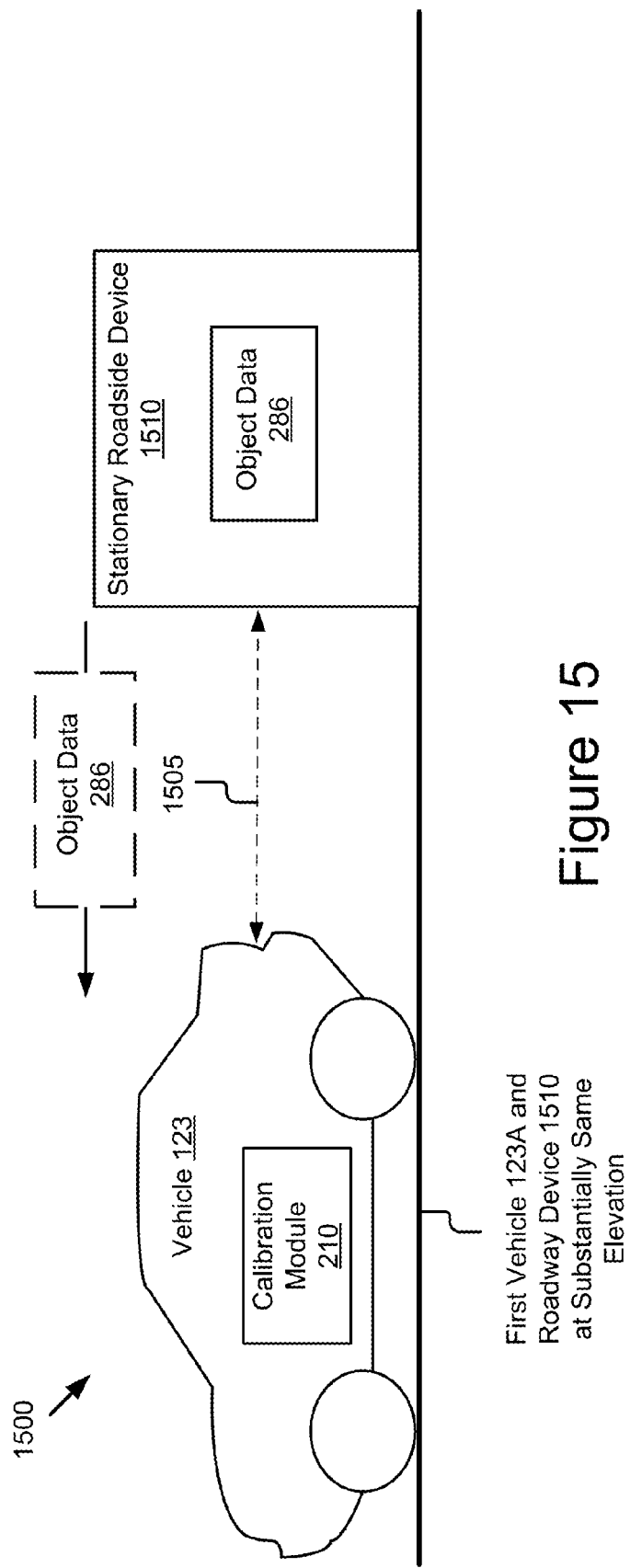
FIG. 15 is a block diagram of an operating environment including a vehicle and a stationary roadside device wirelessly communicating with one another via DSRC.

FIG. 15 is a block diagram of an operating environment 1500 including a vehicle 123 and a stationary roadside device 1510 wirelessly communicating with one another via DSRC.

The stationary roadside device 1510 includes object data 286. The object data 286 may describe a barometric pressure measurement recorded by a second barometric pressure system 200 (not pictured) that is an element of the stationary roadside device 1510.

The stationary roadside device 1510 is communicatively coupled to the vehicle 123. A signal line 1505 indicates a wireless communicative coupling between the stationary roadside device 1510 and the vehicle 123. The signal line 1505 may indicate a DSRC communication among the stationary roadside device 1510 and the vehicle 123.

The stationary roadside device 1510 may provide the object data 286 to the vehicle 123 via the wireless communication indicated by the signal line 1505. The object data 286 depicted with a dashed line and located above element 1505 indicates the object data 286 is being provided to the vehicle 123.

The vehicle 123 may include a first barometric pressure system 200 (not pictured). The first barometric pressure system 200 may include a calibration module 210. The vehicle 123 and the stationary roadside device 1510 may be located at substantially the same altitude.

The vehicle 123 may use the object data 286 to determine if the sensor set 252 (not pictured) of the vehicle 123 is to be calibrated. For example, the object data 286 may include the barometric pressure data 291 of the stationary roadside device 1510. The object data 286 may include quality data 297 indicating the quality of the barometric pressure data 291 of the stationary roadside device 1510. The analysis module 208 (not pictured) of the vehicle 123A may compare the barometric pressure data 291 of the stationary roadside device 1510 to barometric pressure data of the vehicle 123A. The analysis module 208 of the vehicle 123 may determine, based at least in part on the object data 286, that one or more electronic sensors of the sensor set 252 (not pictured) included in the vehicle 123 is to be calibrated.

Figure 16:
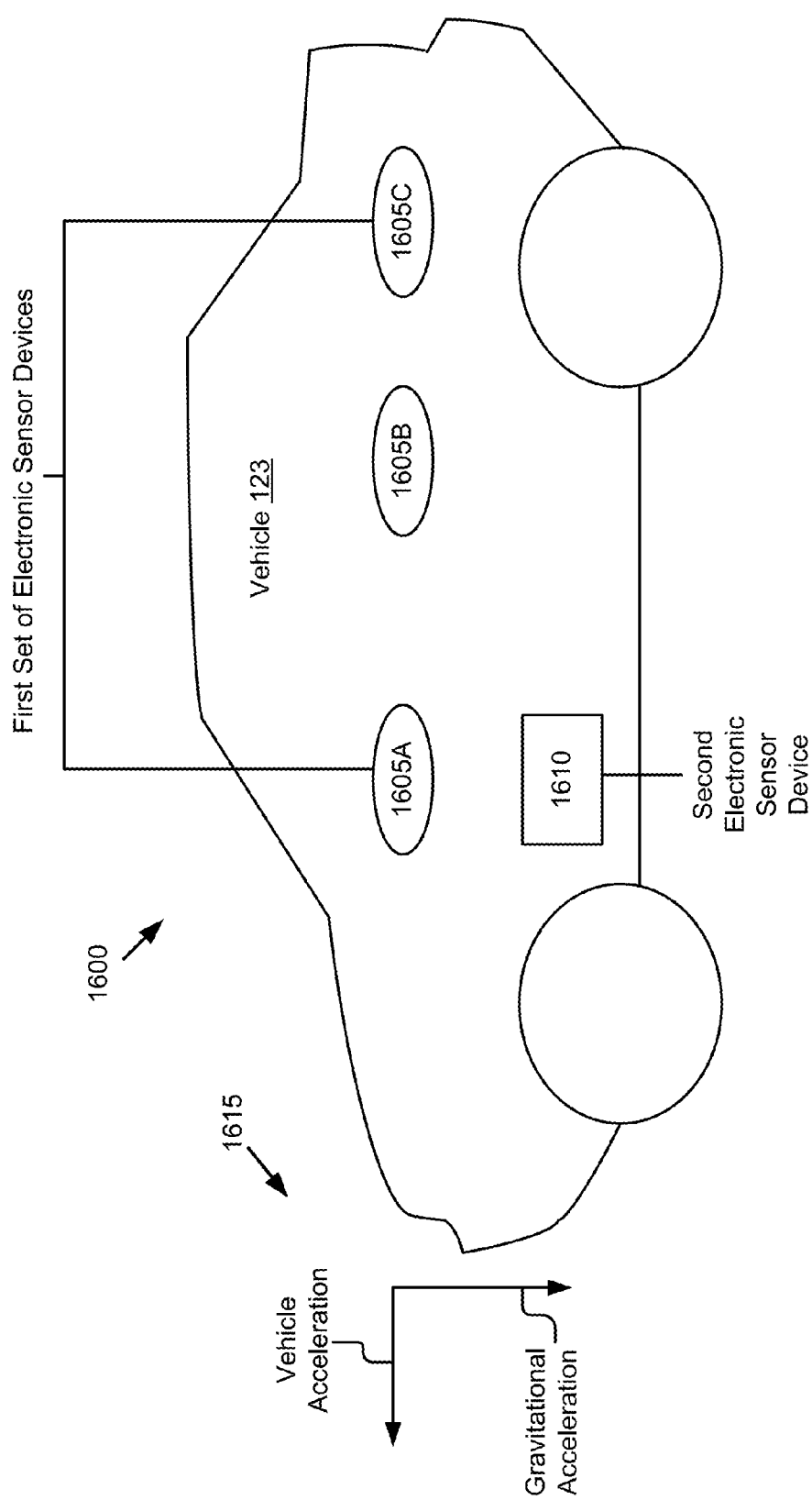
FIG. 16 is a block diagram of a system including a vehicle.

FIG. 16 is a block diagram of a system 1600 including a vehicle 123. The vehicle 123 includes a first set of electronic sensor devices 1605A, 1605B, 1605C and a second electronic sensor device 1610. The first set of electronic sensor devices 1605A, 1605B, 1605C may include a plurality of barometric pressure sensors. The second electronic sensor device 1610 may include an accelerometer. Element 1615 indicates a vehicle acceleration force and a gravitational acceleration force applied to the vehicle 123. The second electronic sensor device 1610 may measure the vehicle acceleration force and the gravitational acceleration force of element 1615. The first set of electronic sensor devices 1605A, 1605B, 1605C may be distributed in the vehicle 123 to account for forces applied to the vehicle 123 and to minimize the effect of these forces based on the acceleration measured by the second electronic sensor device 1610.

For example, the first set of electronic sensor devices 1605A, 1605B, 1605C may be distributed in the vehicle 123 so that the barometric pressure system 200 of the vehicle 123 may: (1) measure and record the acceleration of the vehicle 123; (2) detect the impact of acceleration on the measurement of barometric pressure by one or more of the electronic sensor devices 1605A, 1605B, 1605C; (3) quantify the effect of the acceleration on the barometric pressure measurement recorded by one or more of the electronic sensor devices 1605A, 1605B, 1605C; and (4) adjust the barometric pressure data 291 recorded by the electronic sensor devices 1605A, 1605B, 1605C affected by the acceleration of the vehicle 123 so that the barometric pressure data 291 describes an acceleration-adjusted reading of the barometric pressure associated with the vehicle 123. For example, some of the electronic sensor devices 1605A, 1605B, 1605C may not be affected by the acceleration of the vehicle 123 based on their placement within the vehicle 123 while other electronic sensor devices 1605A, 1605B, 1605C may be affected. The barometric pressure system 200 may determine which electronic sensor devices 1605A, 1605B, 1605C were affected and adjust the barometric pressure data 291 associated with the affected electronic sensor devices 1605A, 1605B, 1605C so that the barometric pressure data 291 is more accurate because it is not affected by the acceleration of the vehicle 123. The barometric pressure data 291 may also be adjusted based on noise caused by open windows of the vehicle or a vehicle ventilation system.

The implementations of the specification can also relate to an apparatus for performing the operations described herein. This apparatus may be specially constructed for the required purposes, or it may include a special-purpose computer selectively activated or reconfigured by a computer program stored in the computer. Such a computer program may be stored in a non-transitory computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations, or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those that practice the art of computer programming. Additionally, the disclosure is in no way limited to implementations in any specific programming language, or for any specific operating system or environment. Accordingly, the disclosure is intended to be illustrative, but not limiting, of the scope of the specification, which is set forth in the following claims.

What is claimed is:

1. A system comprising:
    a wireless communication network which communicatively couples a first vehicle and a second vehicle that is traveling in a same direction as the first vehicle and located in a different lane relative to the first vehicle, wherein the first vehicle includes a set of first electronic sensor devices, a second electronic sensor device and a first onboard vehicle computer;
    wherein the set of first electronic sensor devices are one or more MicroElectroMechanical (MEMS) sensors configured to record first barometric pressure data describing a first barometric pressure associated with the first vehicle;
    wherein the second electronic sensor device is configured to record acceleration data describing an acceleration of the first vehicle;
    wherein the first onboard vehicle computer is communicatively coupled to the wireless communication network, the set of first electronic sensor devices and the second electronic sensor device, and the first onboard vehicle computer is programmed to (1) adjust the first barometric pressure data based on the acceleration of the first vehicle so that the first barometric pressure data describes an acceleration-adjusted reading of the first barometric pressure associated with the first vehicle and (2) automatically transmit the first barometric pressure data describing the acceleration-adjusted reading to a selected channel of the wireless communication network;
    wherein the second vehicle includes a second onboard vehicle computer that is communicatively coupled to the selected channel of the wireless communication network and programmed to receive the first barometric pressure data describing the acceleration-adjusted reading and determine an estimate of altitude separation based on the first barometric pressure data and second barometric pressure data describing a second barometric pressure associated with the second vehicle;

wherein the estimate of altitude separation describes an estimate of whether the first vehicle and the second vehicle are located at substantially the same altitude; and wherein the second onboard vehicle computer is programmed to suppress a collision threat alarm based on the estimate of altitude separation indicating that the first vehicle and the second vehicle are not located at substantially the same altitude.

2. A system of a vehicle comprising:

a plurality of electronic sensor devices configured to record first barometric pressure data describing a first barometric pressure associated with the vehicle wherein each of the electronic sensor devices records a separate barometric pressure reading associated with the vehicle, wherein at least one of the plurality of electronic sensor devices is a MicroElectroMechanical (MEMS) sensor: and an onboard vehicle computer that is communicatively coupled to the plurality of electronic sensor devices and programmed to (1) analyze the separate barometric pressure readings associated with the plurality of electronic sensor devices to determine, for each of the electronic sensor devices, a confidence factor indicating a confidence in the accuracy of the barometric pressure reading for each of the electronic sensor devices and (2) determine whether to provide a sensor service recommendation based on the confidence factor wherein the confidence factor is based in part on one or more of (1) time to live data associated with the plurality of electronic sensor devices and describing an estimate of how long the plurality of electronic sensor devices are estimated to live and (2) time since calibration data associated with the plurality of electronic sensor devices and describing how long since the plurality of electronic sensor devices was calibrated.

3. The system of claim 2, wherein the onboard vehicle computer is programmed to analyze variation of the separate barometric pressure readings among the plurality of electronic sensor devices to determine the confidence factor.

4. The system of claim 2 further comprising a wireless network and a mobile device:

wherein the vehicle and the mobile device are communicatively coupled to the wireless network and the vehicle receives second barometric pressure data describing a second barometric pressure reading associated with the mobile device; and wherein the onboard vehicle computer is programmed to (1) analyze the second barometric pressure reading associated with the mobile device and the separate barometric pressure readings associated with the plurality of electronic sensor devices to determine, for each of the electronic sensor devices, the confidence factor indicating the confidence in the accuracy of the barometric pressure reading for each of the electronic sensor devices and (2) determine whether to provide the sensor service recommendation based on the confidence factor.

5. A system of a vehicle comprising:

a wireless network communicatively coupled to the vehicle and a mobile device, wherein the vehicle includes a first set of electronic sensor devices, a second electronic sensor device and an onboard vehicle computer; and wherein the set of first electronic sensor devices is configured to record first barometric pressure data describing a first barometric pressure reading associated with the vehicle;

wherein the second electronic sensor device configured to record acceleration data describing an acceleration of the vehicle;

wherein the vehicle and the mobile device are communicatively coupled to the wireless network and the mobile device transmits second barometric pressure data describing a second barometric pressure reading associated with the mobile device;

wherein the onboard vehicle computer is communicatively coupled to the wireless network, the set of first electronic sensor devices and the second electronic sensor device, and the onboard vehicle computer is programmed to (1) adjust the first barometric pressure data based on the acceleration of the vehicle so that the first barometric pressure data describes an acceleration-adjusted reading of the first barometric pressure associated with the vehicle, (2) determine a variance between the second barometric pressure reading and the acceleration-adjusted reading of the first barometric pressure associated with the vehicle, (3) determine lateral differential data describing a lateral distance from the vehicle and the mobile device based on the variance and (4) determine an estimate of altitude separation between the vehicle and the mobile device based on the lateral differential data and interval data describing the known interval of increase or decrease in altitude for each unit of lateral distance.

6. The system of claim 5, wherein the system of the vehicle further comprises one or more third electronic sensor devices configured to measure and record temperature and humidity associated with the vehicle and the onboard vehicle computer is further programmed to adjust the first barometric pressure data based on the acceleration, the temperature and the humidity of the vehicle.

7. The system of claim 6, wherein the system is further configured to determine whether to trigger a collision threat alarm based at least in part on the lateral differential data and the estimate of altitude separation between the vehicle and the mobile device.

* * * * *